(12) United States Patent
Murphy et al.

(10) Patent No.: US 11,676,080 B1
(45) Date of Patent: Jun. 13, 2023

(54) SYSTEMS AND METHODS FOR DIGITAL CHECK IN AT A STORE LOCATION

(71) Applicant: Wells Fargo Bank, N.A., San Francisco, CA (US)

(72) Inventors: Pamela Murphy, Walnut Creek, CA (US); Therese Rainsbarger, San Francisco, CA (US); Louann Millar, San Francisco, CA (US); Jonathan Hartsell, Mooresville, NC (US); Pankaj Parekh, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 97 days.

(21) Appl. No.: 17/095,414

(22) Filed: Nov. 11, 2020

(51) Int. Cl.
G06Q 10/02 (2012.01)
G06Q 30/02 (2023.01)
H04W 4/021 (2018.01)

(52) U.S. Cl.
CPC ......... *G06Q 10/02* (2013.01); *G06Q 30/0281* (2013.01); *H04W 4/021* (2013.01)

(58) Field of Classification Search
CPC .... G06Q 10/02; G06Q 30/0281; H04W 4/021
See application file for complete search history.

(56) References Cited

U.S. PATENT DOCUMENTS

| 7,778,937 | B2 * | 8/2010 | Ferrara | G06Q 30/02 |
| | | | | 705/304 |
| 9,064,359 | B2 * | 6/2015 | Lert, Jr. | G06Q 10/0631 |
| 9,256,890 | B1 * | 2/2016 | Schmidt | G06Q 30/0639 |
| 2006/0144430 | A1 * | 7/2006 | Ringdahl | G07F 17/20 |
| | | | | 134/123 |
| 2011/0307547 | A1 * | 12/2011 | Backer | G06Q 10/1095 |
| | | | | 709/203 |
| 2013/0054684 | A1 * | 2/2013 | Brazier | H04M 3/5231 |
| | | | | 709/203 |

(Continued)

OTHER PUBLICATIONS

"LineKing: Coffee Shop Wait-Time Monitoring Using Smartphones" Muhammed Fatih Bulut, Member, IEEE, Murat Demirbas, Member, IEEE, and Hakan Ferhatosmanoglu, Member, IEEE IEEE Transactions on Mobile Computing, vol. 14, No. 10, Oct. 2015 (Year: 2015).*

Primary Examiner — Alexandru Cirnu
(74) Attorney, Agent, or Firm — Foley & Lardner LLP

(57) ABSTRACT

A method, apparatus, and system of managing digital queues for multiple store locations are disclosed. A method includes receiving, by an enterprise computing system associated with the branch location, a request from a mobile device based on the mobile device navigating to a uniform resource locator (URL) from scanning a code associated with the branch location, in response to the request, causing a graphical user interface (GUI) to display on the mobile device that prompts a user for additional information regarding the request, receiving, from the mobile device via the GUI, the additional information including identity information regarding the user and a reason for the request, identifying a queue specific to the branch location based on the request and additional information, adding the user to the queue, and providing, by the enterprise computing system, a confirmation notification to the user indicating that the user has been added to the queue.

16 Claims, 9 Drawing Sheets

(56) References Cited

U.S. PATENT DOCUMENTS

| | | | |
|---|---|---|---|
| 2014/0074743 A1* | 3/2014 | Rademaker | G06Q 30/0601 |
| | | | 705/334 |
| 2014/0172479 A1* | 6/2014 | Gallagher | G06Q 10/063114 |
| | | | 705/7.15 |
| 2016/0217396 A1* | 7/2016 | Yepez | G06Q 10/109 |
| 2017/0011311 A1* | 1/2017 | Backer | G06Q 10/02 |
| 2018/0357686 A1* | 12/2018 | Blair, II | G06Q 30/0283 |
| 2019/0347885 A1* | 11/2019 | Galley | H04L 9/0833 |
| 2022/0043672 A1* | 2/2022 | Chhabra | G06F 9/4881 |

\* cited by examiner

SYSTEMS AND METHODS FOR DIGITAL CHECK IN AT A STORE LOCATION

TECHNICAL FIELD

Embodiments and aspects of the innovation relate to systems and methods for providing a digital check-in system.

BACKGROUND

Entities such as banks, restaurants, hotels, etc. commonly have many branches or locations that clients visit to conduct business or transactions. Clients or other visitors may visit the branches or locations during operating hours. However, during certain time periods (e.g., a pandemic) social or physical distancing may be encouraged to better protect employees and clients. Accordingly, the location may desire or be required to restrict the number of clients or visitors allowed within a branch or location at one time. Efficient and effective contactless innovations that facilitate physical distancing in a branch or location are desired.

SUMMARY

One embodiment relates to a method of managing a digital check-in platform. A method includes receiving, by an enterprise computing system associated with the branch location, a request from a mobile device based on the mobile device navigating to a uniform resource locator (URL) from scanning a code associated with the branch location, in response to the request, causing a graphical user interface (GUI) to display on the mobile device that prompts a user for additional information regarding the request, receiving, from the mobile device via the GUI, the additional information including identity information regarding the user and a reason for the request, identifying a queue specific to the branch location based on the request and additional information, adding the user to the queue, and providing, by the enterprise computing system, a confirmation notification to the user indicating that the user has been added to the queue.

Another embodiment relates to a method of managing digital queues for a store location. The method includes causing, by the enterprise computing system, a graphical user interface (GUI) to display on the mobile device, the graphical user interface prompting a user for information regarding a request, receiving, by the enterprise computing system from the mobile device via the GUI, the information, the information including identity information regarding the user and a reason for the request, identifying, by the enterprise computing system, a store location and a queue based on the information, adding, by the enterprise computing system, the user to the queue that is specific to the store location, and providing, by the enterprise computing system, a confirmation notification to the mobile device of the user indicating that the user has been added to the queue and indicating information regarding an estimated wait-time.

Still another embodiment relates to a branch check-in management system. The system includes a processor and a memory storing instructions that, when executed by the processor, cause the processor to perform one or more operations. The operations include causing the processor to determine that a user associated with a mobile device has a reason to come to a store location of an enterprise, receive geolocation data from the mobile device, determine one or more store locations associated with the enterprise within a geographic area of the mobile device based on the received geolocation data, determine at least one store of the one or more store locations that is capable of assisting the user with the reason and that has a queue with a wait-time below a threshold, transmit a notification to the user regarding the at least one store based on determining that the at least one store is capable of assisting the user with the reason, and in response to receiving a user input from the mobile device, add the user to the queue associated with the at least one store. In some embodiments, the operations may also include monitoring the geolocation of the mobile device in order to track the progress of the user moving toward the store and providing a notification to a computing device at the store to notify the personnel at the store of an expected arrival time of the user and subsequently when the user actually arrives within a geolocation fence of the store. In some embodiments, the notification includes updating a display at the store to indicate the arrival of the user. In some embodiments, the operations include providing the user with directions to the store.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
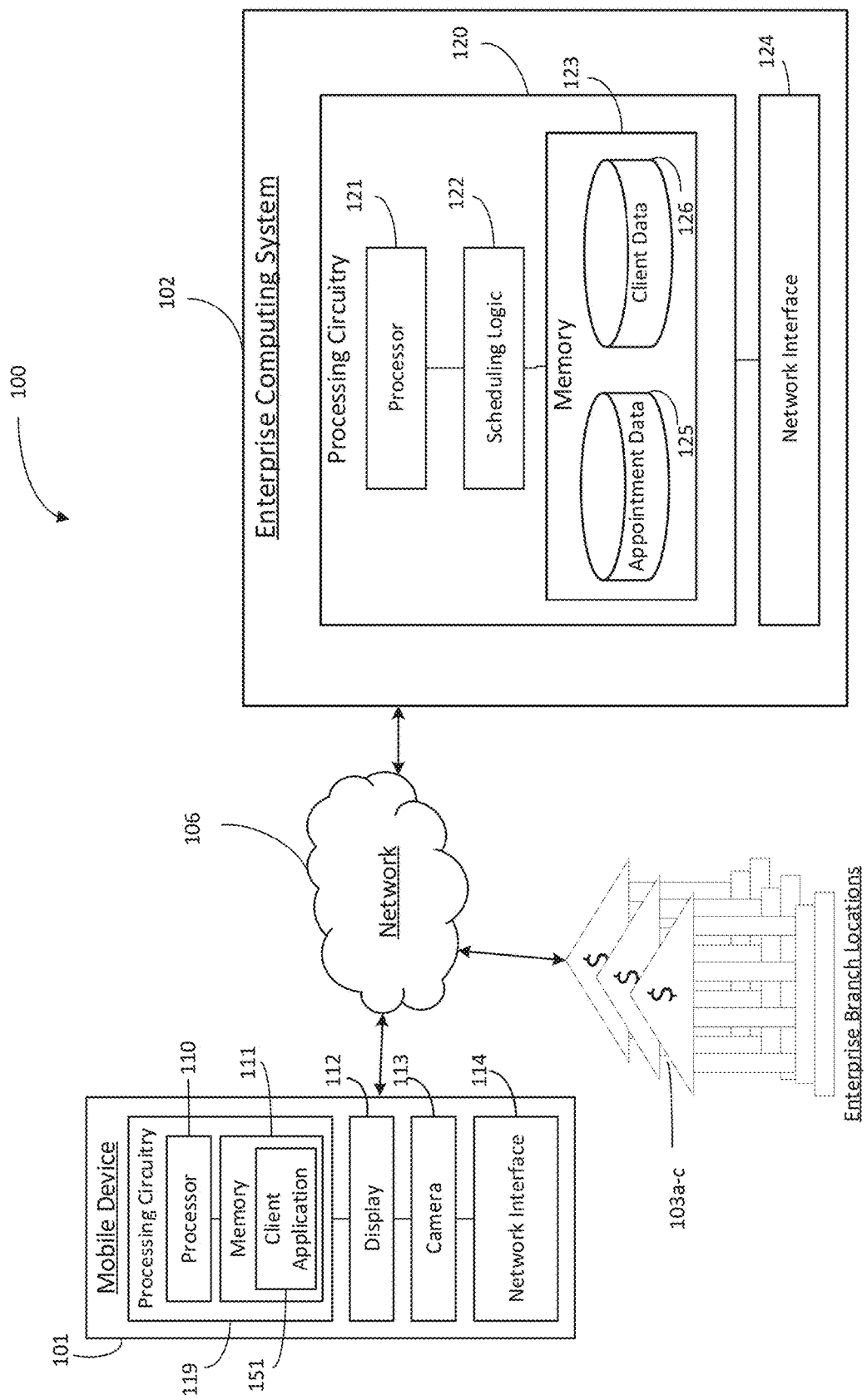
FIG. 1 is a block diagram of a digital check-in computing system, according to an example embodiment.

Systems, apparatuses, and methods for providing and operating a digital check-in computing system are disclosed according to various embodiments herein. The digital check-in computing system may generate and store multiple queues for multiple store locations that are managed according to particular processes that allow for accurate time estimates and reliable user interactions while ensuring that regulatory guidelines are adhered to, for example, during a pandemic where social or physical distancing is desired. The "queue" as described herein refers to a digital waitlist for meeting physically with personnel at a specific location of an enterprise. The queues may be stored in a memory of an enterprise computing system associated with the enterprise. For example, the queues may be stored in a table, an SQL database, or any other form of dynamic database at either branch locations or the enterprise computing system. Each of the queues may be unique to particular capabilities of respective agents of the store location of the enterprise. The digital check-in computing system includes a mobile device coupled to an enterprise computing system. In some embodiments, the enterprise operating the enterprise computing system may be a financial institution. In other embodiments, the enterprise may be a restaurant, government enterprise, or other enterprise that has branches or locations. The digital check-in system is configured to allow a client or visitor to check-in to one or more queues associated with an enterprise location of the enterprise via the mobile device. For example, the digital check-in computing system is configured to allow the client to approach a branch or location associated with the enterprise, be placed into a particular digital queue based on the particular needs or requests that the client has via a mobile device associated with the client, and to be notified via the mobile device when the client may enter the branch or location. In another example, the digital check-in computing system is configured to allow the enterprise computing system to allow clients to come to a store location of multiple store locations based on geolocation data of mobile devices selectively provided by the clients' mobile devices and the determined availability of the multiple store locations to perform one or more actions at the store locations.

During some time periods (e.g., during a pandemic or other public health concern, high traffic times, etc.), the enterprise may desire or be required to restrict the number of visitors (e.g., users or clients) inside of their branches or locations. Additionally, visitors (e.g., especially clients at risk of being exposed to a pathogen causing the pandemic) may not want to wait to be assisted within the branch or location as they fear the increased risk of waiting in a public space. However, users or clients may nevertheless need to go to the branch or location in order to do business or take care of various needs (e.g., paying a bill, transfer money to loved ones, apply for a loan, discuss loan re-financing because hardships caused from the pandemic, and so on). Accordingly, the digital check-in computing system uniquely and efficiently enables a client to conveniently and reliably check-in and wait their turn to be assisted at the location without unnecessarily exposing themselves to a large crowd of people. Moreover, the digital check-in computing system allows for the enterprise to manage the amount of people that are in their branches or locations, which allows the enterprise to enable reliable cleaning routines for both employees of the enterprise and the clients.

The digital check-in computing system provides technological improvements over prior systems by allowing the enterprise computing system to uniquely receive an indication that a client is present, automatically determine the status or availability of the branch location by leveraging various sources of data regarding the status of the branch location, notify the client of the status of the branch (e.g., wait-times, whether the branch has the capabilities to assist the client with their particular needs/wants, etc.), place the client in a particular queue based on the assistance that the client is requesting, notify personnel at the branch of the client request, and responsively notify the client when the client may enter the branch or location. Beneficially, the digital check-in computing system improves the ability of the computing system to interact with users based on dynamic management of information received from one or more branch locations (e.g., and associated queues), scheduled user appointments for each of the branch locations, and real-time walk-in requests from one or more mobile devices associated with respective users.

Referring now to FIG. 1, a block diagram of a digital check-in computing system 100 is shown according to an example embodiment. The system 100 includes a mobile device 101 associated with a client/user, an enterprise computing system 102 associated with an enterprise institution, and multiple branch locations 103a-c (e.g., computing devices at store locations that are associated with the enterprise) that are configured to communicate over a network 106. The mobile device 101 is owned by or otherwise associated with a client/user. The user may be an individual, business representative, large and small business owner, and so on. The user or client may be an existing or a new client to the enterprise associated with the enterprise computing system 102. As described above, the enterprise may be a financial institution, department store, auto repair company, restaurant, government department, or other type of business that has one or more branches, locations, or stores. In the example shown, the enterprise is a financial institution that operates or manages a plurality of branch locations. In other configurations, the enterprise may only operate a single location. The present disclosure is applicable with each configuration.

The branch locations 103a-c are physical locations associated with the enterprise that may have various capabilities for assisting users or clients based on, for example, the agents that are employed at each location. For example, one branch location may allow home mortgage services while other does not because the latter location does not have a home mortgage specialist. The branch locations 103a-c may include one or more computing devices or systems that are configured to interact with agents or users and communicate with the enterprise computing system 102 via the network 106. For example, the branch locations may include various personal computing devices, desktop computers, scanners, laptops, tablets or other computing devices that allow an agent (e.g., a host) to, via various agent inputs, manually enter or remove users from a queue associated with the branch location 103a, manually update the status of a user in the queue (e.g., user has entered the branch, user is being assisted, user is leaving the branch, etc.), and/or manually turn on or off a queue associated with the store. For example, a host may determine that all bankers have left for the day and turn off a corresponding queue associated with bankers. Turning off or otherwise deactivating the queue may prevent the enterprise computing system 102 from entering or adding any additional customers to that queue. Moreover, turning off the queue may indicate to the enterprise computing system 102 that any users with a need to visit a branch location to work with a banker should not be directed to the branch location with the banker queue turned off. In some embodiments, the queues may automatically be managed by the enterprise computing system 102 and/or the branch locations 103a-c. For example, the computing devices at the branch locations 103a-c may be configured to set a schedule for the queues (e.g., turn on banker queue between hours of 9 a.m. and 5 p.m. local time). In some embodiments, the queues may be synchronized with an electronic calendar of particular agents. For example, the enterprise computing system 102 may access the electronic calendars of the agents at a particular branch location 103a, determine the number of available agents at the branch location 103a based on the electronic calendars, and use this information to manage the queues such as turning off the queue if there are no available agents or adjusting the estimated wait-times based on the number of agents that are available. In another example, the enterprise computing system 102 may determine, based on the electronic calendar, that a requested agent (e.g., a particular agent requested by the user to see) is on vacation for a set period of time and, in response, automatically update the queue for this person (e.g., not allow clients or visitors to enter this person's queue while he/she is on vacation).

The mobile device 101 is configured to interact with a client such that the client may conveniently and efficiently provide a request for assistance at a branch or location of the enterprise. The mobile device 101 is shown to include processing circuitry 119 (also referred to as a processing circuit) including a processor 110 and a memory 111, a display 112, a camera 113, and a network interface 114. It should be appreciated that the mobile device may also include other elements as well, such as a vibrate-able element, a speaker, etc. The mobile device 101 is structured to and configured to enable the user to access the network 106 (e.g., to send and receive information/data over the network). Examples of the mobile device 101 include a mobile phone such as a smartphone, a tablet, a wearable computing device (e.g., eyewear), a laptop etc. Wearable computing devices refer to any type of device that an individual wears including, but not limited to, a watch (e.g., a smart watch), glasses (e.g., eye glasses, sunglasses, smart glasses, etc.), bracelet (e.g., a smart bracelet), etc.

The mobile device 101 may include program logic (e.g., instructions) stored by the memory 111 and executable by the processor 110 to implement at least some of the functions described herein. The processor 110 may be implemented as an application specific integrated circuit (ASIC), one or more field programmable gate arrays (FPGAs), a digital signal processor (DSP), a group of processing components, or other suitable electronic processing components. The memory device 111 (e.g., RAM, NVRAM, ROM, Flash Memory, hard disk storage, etc.) may store data and/or computer code for facilitating the various processes described herein. Accordingly, the memory device 111 may be or include tangible, non-transient volatile memory or non-volatile memory. The memory device may include database components, object code components, script components, or any other type of information structure for supporting the various activities and information structures described herein.

As shown, the mobile device 101 includes an enterprise client application 151. The enterprise client application 151 is coupled to the enterprise computing system 102 such that information may be exchanged between the enterprise computing system 102 and the client application 151. In one embodiment, the enterprise client application 151 is hard coded into the memory 111. In another embodiment, the processor 110 may be configured to download the client application 151. For example, a developer may make or create the client application 151 to be downloaded (e.g., via an app store, or in another manner). Responsive to a selection of an appropriate link, the enterprise client application 151 can be transmitted to the mobile device 101 and cause itself to be installed on the mobile device 101. Installation of the enterprise client application 151 allows the client application 151 to be executable by the processor 110. Examples of downloadable enterprise client applications 151 include a mobile banking application, a mobile wallet application, and so on. The client application 151 may be a thin or a thick application. In either situation, the execution of the application (either thick, thin, or smart client application) may enable the user to access one or more accounts of the client (e.g., provided and maintained by the enterprise). Accordingly, execution of the application allows functions associated with that application. In the example shown, the enterprise client application 151 is a mobile banking application that enables a user to view, access, and manage accounts held by the enterprise institution (e.g., checking and/or savings account, mortgage account, brokerage account, and so on).

The network interface 114 may include one or more antennas or transceivers and associated communications hardware and logic. The network interface 114 is structured to allow the mobile device 101 to access and couple/connect to the network 106 to, in turn, exchange information with for example the enterprise computing system 102. That is, the network interface 114 is coupled to the processor 110 and memory 111 and configured to enable a coupling to the network 106. The network interface 114 allows for the mobile device 101 to transmit and receive interne data and telecommunication data. Accordingly, the network interface 114 includes any one or more of a cellular transceiver (e.g., CDMA, GSM, LTE, etc.), a wireless network transceiver (e.g., 802.11X, ZigBee, WI-FI, Internet, etc.), and a combination thereof (e.g., both a cellular transceiver). Thus, the network interface 114 enables connectivity to WAN as well as LAN (e.g., Bluetooth, NFC, etc. transceivers). Further, in some embodiments, the network interface 114 includes cryptography capabilities to establish a secure or relatively secure communication session between other systems such as the enterprise computing system 102, a second user device, the computing devices at one or more branch locations 103a-c, and/or any third-party computing system. In this regard, information (e.g., account information, login information, financial data, and/or other types of data) may be encrypted and transmitted to prevent or substantially prevent a threat of hacking.

It should be understood that the mobile device 101 may include other structures with associated functionality as well. For example, the mobile device 101 and/or client application 151 may include location determination logic. The location determination logic determines the location of the mobile device 101 (e.g., for use by the client application 151). A user may opt-in to using the location determination logic to provide enhanced protection against fraudulent transactions, as described below. The location determination logic may use a satellite (GPS) sensor or cellular towers to determine the location coordinates of the mobile device 101 include a global positioning system (GPS) structured to at least one of determine or receive data indicative of the geolocation of the mobile device 101. This "location data" may provide an indication of a location of the mobile device 101. In certain embodiments, location data may also be used to identify a particular branch or location associated with the enterprise that the client wishes to enter in order to receive assistance.

The network 106 provides communicable coupling between the components of FIG. 1. The network 106 may include one or more of a local area network, a wide area, a wired network, and/or a combination of wireless and wired networks. Examples of network configurations include the Internet, a cellular network, Wi-Fi, Wi-Max, a proprietary banking network, etc. In some embodiments, the network 106 includes a proprietary banking network to provide secure or substantially secure communications. The network 106 is structured to permit the exchange of data, values, instructions, messages, and the like between and among various components of FIG.1.

The enterprise computing system 102 is associated with an enterprise or provider institution. As mentioned above, the enterprise institution may be a financial institution such as a bank, credit union, credit card company, and so on. As described herein, the enterprise institution operates or manages one or more physical stores or locations, which are shown as branches 103a-c. In the example shown, the enterprise institution is a financial institution operating and coupled to one or more branch locations 103a-c. As shown, the enterprise institution computing system 102 is structured as one or more backend processing components, such as servers. The enterprise institution computing system 102 includes processing circuitry 120 including a memory device 123, and a network interface 124. The network interface 124 is structured to enable the enterprise computing system 102 to couple or connect to and to exchange information over the network 106 with, for example, the mobile device 101. The network interface 124 may be coupled to the processing circuitry 120 in order to enable the processing circuitry 120 to receiving and transmit messages, data, and information via the network 106.

The processing circuitry 120 is shown to include a processor 121 and a memory 123. The processing circuitry 120 may also include scheduling logic 122. In some embodiments, the processing circuitry 120 may include one or more processors 121 that are configured to communicate such that the processing circuitry 120 may perform or assist in performing any of the operations, steps, or methods discussed herein. The scheduling logic 122 may be non-transitory machine-readable instructions stored thereon that when accessed and executed by the processor 121, cause the processor 121 to perform, execute, or assist in executing any of the operations, steps, or methods discussed herein. As an example, the scheduling logic 122 may include an executable program or application that has rules, particular procedures, or other logic therein that, when executed by the processor, enable the enterprise computing system 102 to perform or assist in performing the operations and methods discussed herein.

The memory 123 may one or more tangible, non-transient volatile memory or non-volatile memory devices configured to digitally store information. In the example shown, the memory 123 includes an appointment database 125 and a client database 126. The appointment database 125 and the client database 126 are structured as repositories for information. In this regard, the client database 126 is configured to store, hold, and maintain information for a plurality of clients of the enterprise. For example, the client database 126 may store information such as client information (e.g., names, addresses, phone numbers, and so on), preferred branch locations, or other information. The appointment database 125 is configured to store, hold, and maintain information regarding clients and set appointments. An "appointment" is an arrangement for the client or visitor to meet physically with an agent at a particular store or branch location 103a-c at a particular time. For example, a client may schedule an appointment at the branch or location well in advance (e.g., days, weeks, or months) ahead of the appointment and the enterprise computing system 102 may store the appointment information (e.g., time and date of appointment, whom the appointment is with, location of the appointment etc.). The information contained in the appointment database 125 may be used by the enterprise computing system 102 to determine wait-times, availability of a particular employee, or update an availability queue for clients that do not have an appointment, but has recently checked-in. Moreover, the appointment database 125 may include multiple queues, each queue defining a waiting list for clients that have checked in and/or have appointments at particular stores, locations, departments, or with particular employees. For example, each branch location may have multiple queues that are specific to various services offered by the branch location (e.g., a home lending queue, a commercial banking queue, etc.). Accordingly, the list of queues is dynamic for and not the same for all the branch locations. The "dynamic" nature of the queues refers to the list of queues for a branch location changing with time (e.g., a home mortgage specialist may leave the particular branch thereby removing that branch's ability to provide home mortgage services and so that particular queue is removed from that branch location) in combination with the queue itself changing with time (e.g., number of clients/visitors in the queue, availability of personnel to service the people in the queue, and so on).

Figure 2:
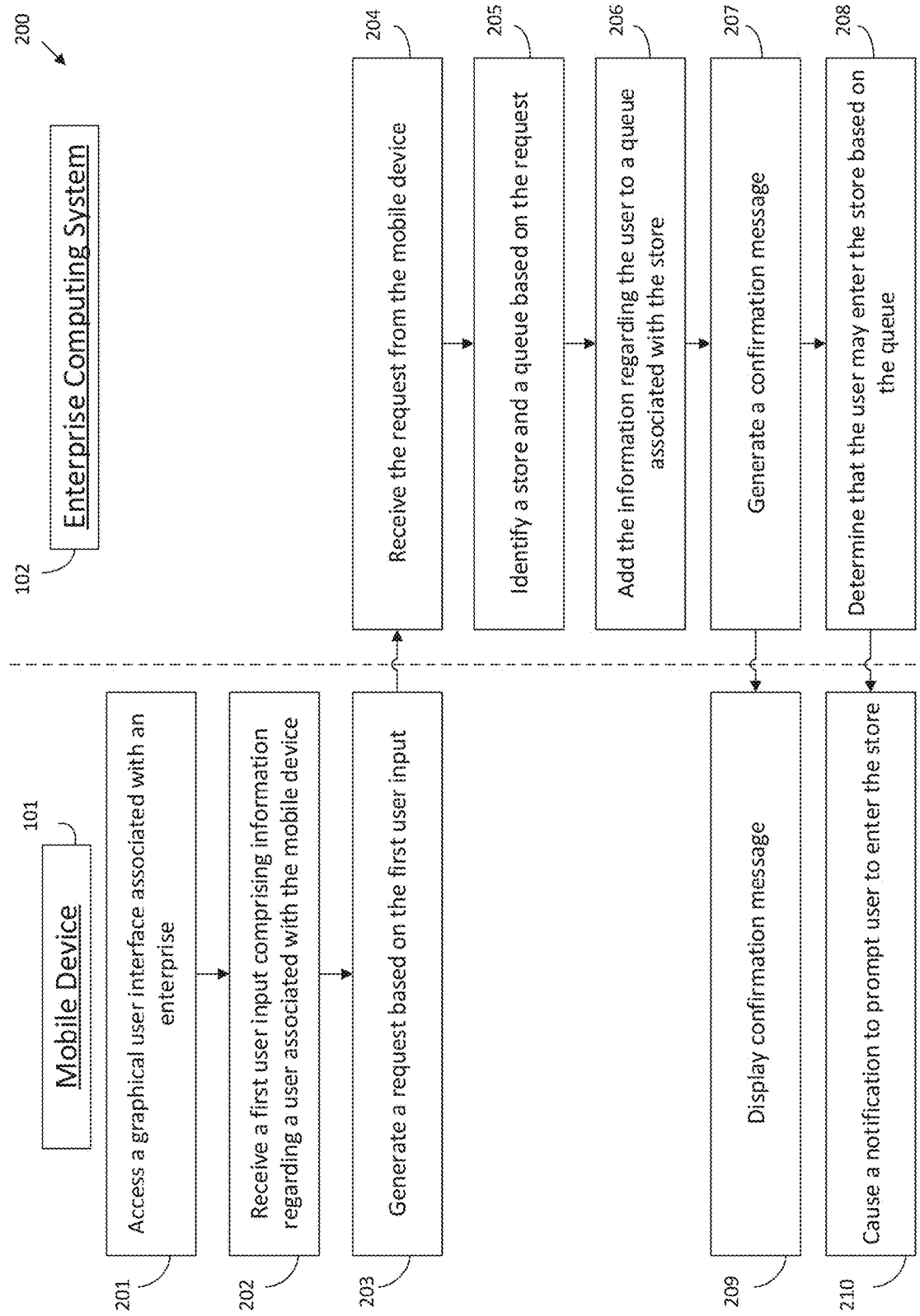
FIG. 2 is a flow diagram of a method of digitally checking into a queue using the system of FIG. 1, according to an example embodiment.

Referring now to FIG. 2, a flow diagram of a method 200 of digitally checking into a queue is shown according to an example embodiment. Because method 200 may be implemented using the components of FIG. 1, reference may be made to one or more components to aid explanation of method 200.

At process 201, the mobile device 101 accesses a graphical user interface of an enterprise. In some embodiments, the graphical user interface includes a welcome page. The mobile device 101 may navigate to and display the welcome page, for example, either (1) in response to user scanning a code (e.g., barcode, QR code, etc.), which may cause either (i) the enterprise client application 151 to automatically launch and display the welcome page, or (ii) a web browser on the mobile device 101 to automatically launch and navigate to a general (e.g., associated with the enterprise) or unique (e.g., associated with a particular branch location) URL displaying the welcome page, or (2) in response to the user launching the client application 151 and selecting an option therein to be added to a waitlist (i.e., queue). More particularly, in example (2), the user input is a selection of an icon on the display of the mobile device that causes the enterprise client application 151 of the enterprise to be launched on the mobile device 101. The input may include a credential to access the application 151 (e.g., biometric information such as a face scan or a fingerprint, a passcode, a username and password, etc.). After authentication, access to the client application 151 is granted. At which point, the user input may further include the user selecting an option or icon within the client application 151 to visit a particular store location 103a-c thereby causing the client application to navigate to and display the graphical user interface including the welcome page. Accordingly, it should be appreciated that communication with the enterprise computing system 102 or branch computing system may be via the enterprise client application 151 and/or via a website provided by the, for example, enterprise computing system.

In example (1), the user input may include the client entering a uniform resource locator (URL) associated with the enterprise into a browser application of the mobile device 101, or the client launching a camera application of the mobile device 101 and capturing (e.g., scanning) an image of a code (e.g., QR or barcode displayed at a branch location 103a-c) associated with a branch location. For example, the enterprise may provide each store with a unique (e.g., and/or enlarged) code that the store may place in front of the store such that the code is visible and/or readable from outside of the store. The capturing of the image of the code may cause the mobile device 101 to automatically navigate to a general or unique URL associated with the code in order to display the welcome page. In some embodiments, the unique URL may indicate to the enterprise computing system 102 the particular store that the client is present at.

At process 202, the client application 151 of the mobile device 101 receives a first user input regarding information about the user (e.g., client or potential client) associated with (e.g., operating) the mobile device 101. In particular, the client enters in user information into one or more fields displayed on the welcome page. In an example where the user accessed the graphical user interface including the welcome page via a selection within the client application 151 after logging in, the user may enter into a first field (e.g., an appointment reason field), the purpose of the users visit to the store today (e.g., deposit money, re-finance loan, open or close an account, etc.) and enter into a second field (e.g., a store location field) a selection of one or more branch locations which the user desires to visit. In another example, where the user accessed the welcome page via a scan of a code displayed at a branch location, the user may enter their first name into a first name field, last name into a last name field, a middle initial into a middle name field, a reason for the visit in an appointment reason field, and/or mobile phone number into a phone number field. In some embodiments, such as when the welcome page was accessed via a selection on the client application or via a general URL, the user input may also include a selection or indication (e.g., into a respective field) regarding which store into a store selection field (e.g., or employee at the store in an employee selection field) that the user wishes to be placed in queue for. That is, in some embodiments, the GUI may include additional or fewer fields that each allow the user to select options and provide contact information of the user to the enterprise. However, in other configurations and rather than explicitly providing information via the enterprise client application of the mobile device, the unique URL that is accessed from a scanning of the code (e.g., a QR code, barcode, etc.) may automatically navigate a web browser application of the mobile device 101 to a particular welcome page associated with the store that is associated with the unique URL such that user input regarding the particular store that the user is at is not needed. Moreover, the GUI may be dynamic in that the fields provided may depend on the way the user accesses the GUI. For example, if the user accesses the GUI after launching the client application and signing into an associated account (e.g., the user is a client) on the client application, the GUI may not include the personal contact information. Rather, the enterprise computing system 102 may automatically populate the personal contact information based on contact information stored in the client database 126 or the personal contact information fields may not be provided (or the personal information may be stored or cached in the client application 151 to populate various fields of one or more GUIs of the application 151). In another example, if the user accesses the GUI via a web browser more fields such as the personal contact information fields may be included and/or required for the user to enter before proceeding.

At process 203, the client application 151 generates and transmits a request for the user to be added to a queue to the enterprise computing system 102 based on the user input. The request refers to an indication that the user desires assistance at a particular branch location along with the user information received at process 201. For example, after entering the user information, the client may select an icon (e.g., an "Enter" or "Continue" icon) that causes the mobile device 101 to generate and package the user information to be sent to the enterprise computing system 102 along with a request to be entered into a queue. In some embodiments, the request may also include a request for particular information such as wait-times, number of people in the queue, or other information. Moreover, the enterprise client application 151 of the mobile device 101 may require the user to complete a challenge (e.g., a CAPTCHA challenge) before transmitting the request. The challenge is designed to determine whether or not the client is a human. The challenge may ensure that the enterprise computing system 102 is only entering actual clients into the queue and that spammers or hackers cannot clog the queue or otherwise cause the enterprise computing system 102 to process misinformation. Alternatively, the request may be sent by the web page upon clicking a submission, which may be outside the client application 151.

At process 204, the enterprise computing system 102 receives the request from the mobile device 101 via the network. In response to receiving the request, the enterprise computing system 102 may begin processing the request. For example, the enterprise computing system 102 may analyze the request to ensure that the request includes all of the information needed in order for the enterprise computing system 102 to successfully enter the client into a specific queue. For example, the enterprise computing system 102 may analyze the request to ensure that the request includes all of the information needed to enter the client into a queue. For example, information needed to enter the client into a queue may include an indication of which store the client is at or will be at, a way to contact the client (e.g., mobile phone number, email, or other information identifying the mobile device 101 such that the enterprise computing system 102 can provide a push notification to the mobile device 101), and/or an indication of the purpose for the visit by the client. If the enterprise computing system 102 determines that the request is insufficient (e.g., that the request does not include the information needed), the enterprise computing system 102 may send a re-direct instruction to the mobile device 101 that causes the mobile device 101 to update or navigate to a graphical user interface that indicates to the user the information that is missing or indicates to the client that the request was invalid. In some embodiments, the client application 151 may determine that information is missing and request additional information via the graphical user interface and not transmit a request until all required fields and appropriate information is provided.

At process 204, the enterprise computing system 102 identifies the store and a specific queue based on the request. The enterprise computing system 102 may be managing, storing, or updating a queue for multiple different stores or locations. Further, each store or location may have multiple queues. Each queue may be specific to personnel with various expertise such that the person is meeting with an agent that is qualified and able to assist the user based on the reason visiting. For example, a bank branch may have a banker queue (e.g., a first queue) and a teller queue (e.g., a second queue). The banker queue is a queue (e.g., waiting list) for the client to discuss issues with a banker and the teller queue is a queue (e.g., waiting list) for the client to discuss issues with a teller. In some embodiments, there may be additional or fewer queues based on the services offered via the enterprise, available employees at a particular store, or waiting times. In some embodiments, the multiple queues may be manually managed by an agent of the enterprise via a computing device located, for example, at the branch location 103a. In some embodiments, the agent may close or stop queues via an agent input into the computing device thereby indicating to the enterprise computing device 102 that the particular queue is no longer available.

The enterprise computing system 102 may identify the store via an indication within the request. The indication within the request may either be indicated by the unique URL based on the code (e.g., a QR code, barcode, etc.) that was scanned by the mobile device when initially navigating to the welcome page or indicated by a selection of the user as part of the user input in process 202. Or, the indication may be provided via the enterprise client application 151 (e.g., a user may select a drop down menu to pick a location to obtain services at). In some embodiments, the request may include a location of the mobile device 101 (e.g., the mobile device 101 identifies the location of itself and packages the location into the request) and the enterprise computing system 102 may identify a store location that the user is near based on the proximity of the location of the mobile device 101 to known store locations. In some embodiments, the enterprise computing system 102 may include rules that a user must be within a geographic area associated with the store location before the user can be added to the queue. For example, the request to be added to the queue may include geolocation data of the mobile device 101, the enterprise computing system 102 may verify that the geolocation of the mobile device 101 is within the geographic area associated with the branch location before adding the user to the queue.

The enterprise computing system 102 may identify the queue based on the reason or purpose for the user's visit indicated via the user inputs and packaged into the request. For example, the reason for the client visit may be that the client needs to transfer money or pay a bill, in response, the enterprise computing system 102 may identify the teller queue (e.g., the second queue) as the queue in which the client should be placed. In another example, the reason for the client visit may be that the client needs to re-finance a loan, in response, the enterprise computing system 102 may identify that the banker queue (e.g., the first queue) as the queue in which the client should be placed. That is, the enterprise computing system 102 may have rules that establish that particular reasons for the client visit correspond to a first queue, other reasons for the client visit correspond to a second queue, and yet other reasons correspond to a third queue. In some embodiments, the enterprise computing system 102 may include a look-up table or other referential database that establishes a list of reasons for the client visit and the corresponding queue in which a client should be placed. In some embodiments, the enterprise computing system 102 may have a general or default queue that the enterprise computing system 102 places clients in when the reason for the client visit is unclear, unknown, or otherwise undefined. The multiple queues and technical ability for the enterprise computing system 102 to place clients in a relevant or corresponding queue based on the reason for the visit provides efficiency of the client visit and also reduces the points of contact between the client and employees.

In some embodiments, the request received from the mobile device 101 may include an indication of the particular queue that the user wants to be added to. For example, there may be a drop down menu of services provided that are specific to each branch location. A user may select from multiple options in the drop down menu from the list in the drop down menu to select the reason for their visit. The enterprise computing system 102 may use the user selection to determine a particular queue for the branch location 103a, query the computing device of the branch location 103a to obtain real-time information regarding the queue at that branch, and provide to the mobile device 101 a real time indication of the status of the queue (e.g., whether the queue is accepting new walk-up customers, wait-times, number of clients in the queue, number of agents present, etc.). In this way, the enterprise computing system 102 may dynamically communicate with the branch location 103 and the mobile device 101 to provide the user with real-time information thereby improving the interaction between the computing system and the user.

At process 206, the enterprise computing system 102 adds the user information to the queue identified in process 205. More generally, the enterprise computing system 102 enters the client into the queue identified in process 205. The enterprise computing system 102 may access the queue and update the queue to place the user into the queue. In some embodiments, the enterprise computing system 102 may place the user into to the queue based on pre-defined rules. For example, the user may be placed into the queue on a first-come-first serve basis such that the client is added to the end of the queue (e.g., the latest client has the longest wait-time). In another example, the user may be placed into the queue based on other rules. For example, a user that is at the store (e.g., which may be indicated to the enterprise computing system 102 based on a determination that the user scanned the code displayed at or outside of the store location) may be added to the queue above another client that checked in via a general URL (e.g., the general URL may indicate to the enterprise computing system 102 that the client is not currently at the store) or if the location of the mobile device 101 (e.g., transmitted to the enterprise computing system 101 during the request is not with a pre-defined proximity to the store location. In some embodiments, the queue may also include users or clients that have pre-scheduled an appointment. In some embodiments, a user that has a pre-scheduled appointment may be added near the top of the queue if they arrive during a respective appointment window.

At process 207, the enterprise computing system 102 generates and transmits a confirmation page to the mobile device 101. Alternatively, the enterprise client application may generate a confirmation page regarding adding the client to the queue. The enterprise computing system 102 may generate the confirmation page via determining the amount of clients that are in the queue before the client, estimating a wait-time based on a statistical average of amount of time that each client spends in the location, and/or generating instructions to the client based on preferences of the store location. For example, for a particular store, the enterprise computing system 102 may track and store the amount of time from the time that the client is allowed in to the time that the client leaves based on the particular reason for the client visit within a database and calculate a statistical average amount of time that each client spends in the store. The enterprise computing system 102 may calculate an estimated wait-time based on the amount of clients in the queue before the client, the reasons that each of the clients are in queue for, and the statistical average amount of time that each client will likely spend in the store. For example, a loan refinancing reason for visiting may have an average time of 30 minute, origination of a mortgage may have an average time of 45 minutes, opening a checking account may have an average time of 15 minutes, making a cash deposit may have an average wait-time of 4 minutes. The enterprise computing system 102 may determine that there are six people in the queue before the user, of the six people, four may have listed depositing cash as the reason for their visit and two may have listed opening a checking account for the reason for their visit. Accordingly, the enterprise computing system 102 may use the statistical information to calculate a wait-time for the user of 46 minutes (e.g., 4 people times 4 minutes each in addition to 2 people times 15 minutes each). Moreover, particular stores may be larger or different staffing such that more clients may enter. The amount of people allowed within a particular store and the amount of people that are currently staffed may be stored within memory and used to more accurately estimate the wait-time. In some embodiments, the enterprise computing system 102 may also be in communication with an enterprise device (e.g., a tablet, mobile phone, or computer) at the branch location 103a-c such that the enterprise computing system 101 can display to employees the status of the queue and the employees can communicate to the enterprise computing system 101 via the enterprise device a message or an indication of when a particular client in the queue may enter, when a particular client does enter, and/or when the particular client exits.

The confirmation page may be designed to communicate to the client that the client check-in has been confirmed, the number of people that are before the client, and the estimated amount of time before the client may enter the building. The confirmation page may also be designed to communicate specific instructions to the client such as to approach the building to be greeted by a doorman. The specific instructions may be unique to the branch location and are configured to relay procedural information to the client to ensure that protocols of the enterprise and any regulations are followed. In addition, the confirmation page may include a recommendation. The recommendation may include a hyperlink to an online portal and/or a stock page regarding instructions when arriving that are specific to the branch location 103a based on protocols or standards for the specific branch location 103a. In some embodiments, the hyperlink may lead to a web page regarding instructions may that are targeted to the client based on the reason for the client visit inform the client may be able to remedy the reason for the client visit via an online option and provide them with targeted instructions (e.g., targeted based on the reason for the client visit) to assist the client with remedying any issues. Technically and advantageously, the enterprise computing system 102 may determine (e.g., via cross referencing within a table or referential database) particular recommendations to particular clients based on the indicated the reason for the client visit. The enterprise computing system 102 may then populate the recommendation, hyperlinks, or instructions into a confirmation page that is configured to be displayed to the client via the mobile device 101. For example, in some embodiments, the enterprise computing system 102 may determine that a nearby store (e.g., not the store that the user is present at) has a lower wait-time and/or can accommodate the reason for the users visit more efficient and, in response, automatically transmit a recommendation to the mobile device 101 to notify the user of the alternative branch locations. The enterprise computing system 102 may determine or access wait-times for all of the queues at each branch location 103a-c, determine that a queue that is associated with personnel that could assist the user based on the provided reason for visiting has a wait-time below a threshold (e.g., 30 minutes), determine that the branch location 103b is within a pre-defined range (e.g., under 10 miles) from the user (e.g., based on geolocation data received from the mobile device 110), and provide a recommendation to the user to proceed to the other branch location 103b. The user may respond to the recommendation via a user input indicating that the user would like to be added to the queue at the other branch location 103b and, in response, the enterprise computing system 102 may add the user to the queue at the other branch location 103b.

At process 209, the mobile device 101 receives the confirmation page and displays the generated confirmation page via a graphical user interface on the display of the mobile device 101. Or, as mentioned above, the enterprise client application 151 may receive the information described above (estimated wait-time, number of people in front of the user in the queue, instructions for what to do when arrived, etc.) to generate the confirmation or instruction page for the user. In this way, the enterprise client application 151 may include preset fields that are populated with the information described above and provided to the user via the client application. The confirmation page may is displayed on the mobile device 101. In some embodiments, the confirmation page may include a selectable icon that allows for the client to request removal from the queue if the client wishes (e.g., the client remedies concerns via the online option or determines that the wait-time is too long). The selectable icon may cause the mobile device 101 to transmit the removal request to the enterprise computing device 102 and the enterprise computing device 102 may remove the client from the queue. In some embodiments, the enterprise computing system 102 may monitor the geolocation data of the mobile device 101 and automatically remove the user from the queue based on a determination that the mobile device 101 is no longer within a pre-defined area of the branch location 103a. For example, the user may wish not to wait any longer and drive away from the branch location 103a, the enterprise computing system 102 may detect that the user has left based on the geolocation data mobile device 101 indicating that the user has left or is leaving, and prompt the user via a notification to respond whether the user would like to remain in the queue or not. In some embodiments, the enterprise computing system 102 may automatically remove the user from the queue in response to determining that the user is outside a pre-defined proximity of the branch location 103a. In some embodiments, the branch location 103a (e.g., computing device at the branch location 103a) may be used via an agent input to manually remove or add a user to the queue.

At process 208, the enterprise computing system 102 determines that the client may enter the store based on the queue. For example, the enterprise computing system 102 may receive an indication from the enterprise device at the particular store 103a-c that the next client may proceed to enter that particular store. That is, the enterprise computing system 102 determines that the client has come up on the queue and can be assisted by an employee within the particular store. The enterprise computing system 102 may, in response, generate and transmit a notification to the mobile device 101. Alternatively, the computing device of the particular store 103a-c may directly notify the mobile device 101. For example, once a store is identified, the notifications between the mobile device 101 (user) and the particular store 103a-c may be handed off from the enterprise computing system 102 to the computing device(s) at the particular store. This way, an extra data transmission may be avoided (e.g., from the particular store to the enterprise computing system to the mobile device versus from the particular store to the mobile device directly). Thus, in some embodiments, a handoff from the enterprise computing system 102 to a particular enterprise/store/branch location occurs after the particular enterprise/store/branch location is identified.

The notification may be a push notification (e.g., if the mobile device has an application associated with the enterprise downloaded onto the mobile device), a text message, a phone call with an automated message, or an email based on the information regarding the preferred way that the client wants the notification as indicated in the request. The notification is configured to and designed to indicate to the client to approach and enter the store. In some embodiments, the notification may include specific instructions (e.g., "enter in the door on the left and meet the greeter for a temperature check") based on the particular store. In some embodiments, the computing device at the branch location 103*a* (e.g., displaying a real-time status of the queue to an agent via an API to the queue stored at the enterprise computing system 102) may be used such that an agent can manually cause the transmission of the notification or cause a transmission of a notification customized by the agent.

At process 210, mobile device 101 receives the notification and prompts the user to enter the store. In one example, the mobile device 101 may ring if the notification is in the form of a call. In another example, the mobile device 101 may vibrate, sound off, and/or display the push notification or text message based on the settings of the mobile device 101. In some embodiments, the client may be able to respond to the notification (e.g., via texting back or launching the application on the mobile device) to indicate to the enterprise computing system 102 that the client is on his/her way or that the client no longer needs assistance. The enterprise computing system 102 may then update the queue and/or cause a notification to be transmitted to the enterprise device at the store that is designed to interact with the employees and inform them the status of the client. The enterprise computing system 102 may update the queue visually on a computing device at the branch location 103*a* to indicate to the agents at the branch location 103*a* of the updated queue status.

Figure 3:
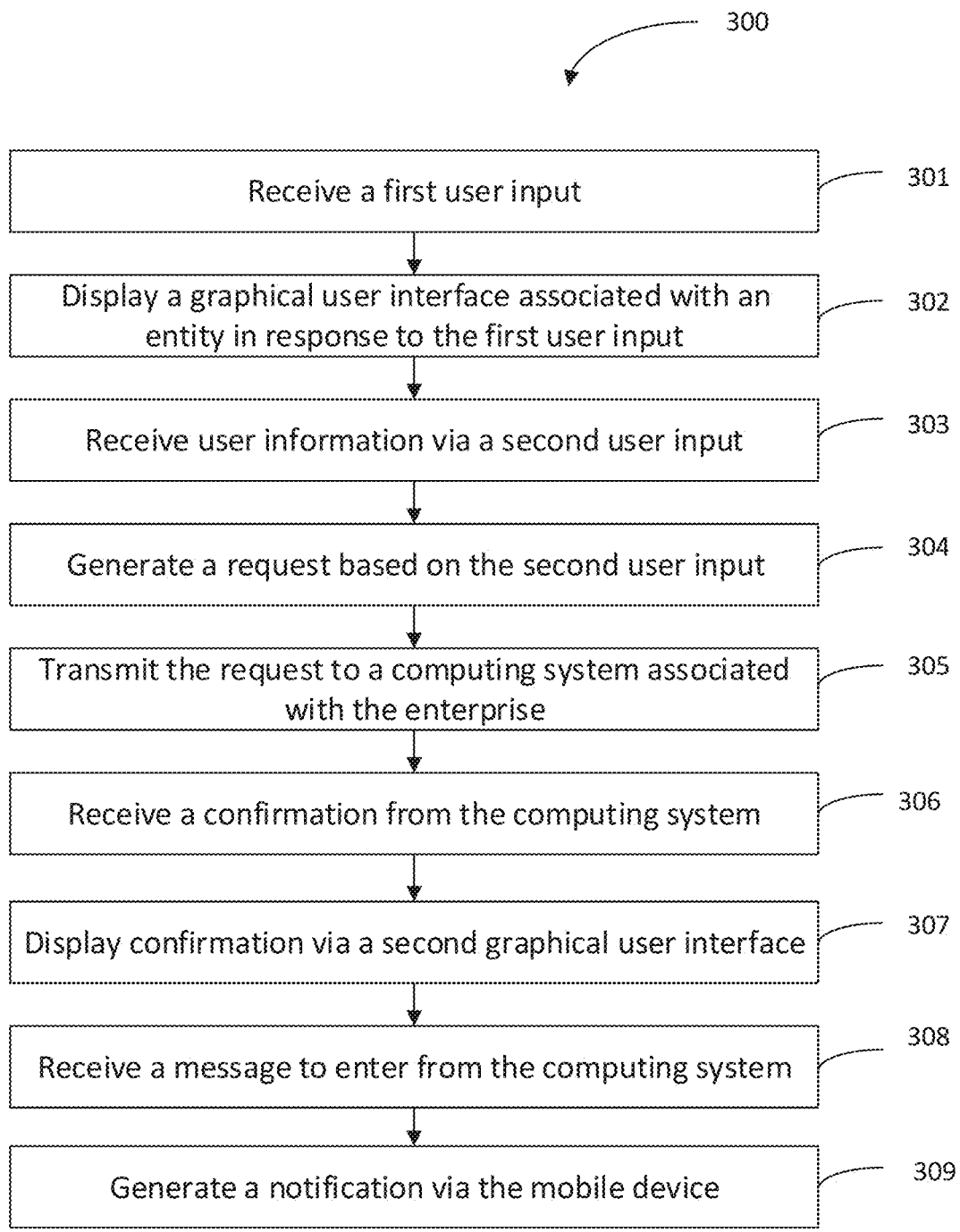
FIG. 3 is a flow diagram of a method of digitally checking into a queue via the mobile device of FIG. 1, according to an example embodiment.

Referring now to FIG. 3, a flow diagram of a method 300 of digitally checking into a queue via a mobile device is shown according to an example embodiment. In particular, the method 300 includes checking into a queue of an enterprise using a mobile device that communicates with an enterprise computing system associated with a branch location of the enterprise institution operating or managing the enterprise computing system.

At process 301, the mobile device receives a first user input. In one embodiment, the first user input may be an automatic navigation process. In this way, the user may open a camera function of the mobile device and scan a code. The code includes a URL that causes a web browser on the mobile device 101 to navigate to the URL. The URL may be specific to a particular branch location. In another embodiment and alternatively, the first user input may be via the enterprise client application 151. The user may provide required credentials (biometrics, passcode, username and password, etc.) to access the client application in order to access and utilize the digital queue system described herein. In such embodiments, the credentials may serve as a proxy to the enterprise computing system 102 and or client application 151 for information regarding the identity of the user and contact information of the user.

At process 302, the mobile device 101, in response to the first user input, displays a graphical user interface associated with the enterprise on a display of the mobile device. The graphical user interface includes a welcome page that may be generated via an enterprise computing system and accessed by the mobile device in response to the first user input in the first embodiment. In the alternative other embodiment, the welcome page may be generated by the client application 151 upon accessing and successful authenticating into the client application 151. The welcome page may include various fields and information sections that allow the user to request to be entered into a queue (e.g., a waitlist) associated with the enterprise.

In the first embodiment described above, the first user input may include the user scanning a code via the mobile device 101 at a branch location 103*a-c*. For example, the code may be displayed outside of the branch location 103*a-c* such that, upon arriving at the branch location 103*a-c*, the user may launch a camera application and scan the code with the mobile device 101 such that the scan causes mobile device 101 to navigate to a URL associated with the code or launch the client application 151 and display the graphical user interface. In another example, the first user input may include the user selecting to launch the client application 151 on the mobile device 101 and selecting an option within the client application 151 to be added to a waitlist for a particular branch location 103*a-c*. As described above, the contents of the graphical user interface (e.g., the welcome page) may include different fields based on the first user input and thereby how the mobile device navigates to the graphical user interface. Examples of welcome pages are discussed further herein and particularly in reference to FIG. 6*a* below.

At process 303, the mobile device 101 receives user information via a second user input. That is, the user may interact with the graphical user interface (e.g., welcome page) and use the input/output features of the mobile device to enter user information into the mobile device 101. The mobile device 101 receives the user information via the second user input and may locally and/or temporarily store the user information with a memory device. In the example of the first user input scanning the code, the user information may include user information may include a first name of the user, a last initial of the user, an indication of the reason why the client is requesting to be added to queue, and/or a preferred method of communication (e.g., mobile phone number, email address, or other forms of communication). For example, since the mobile device 101 accesses the graphical user interface via scanning the code, the enterprise computing system 102 may need information to identify the user (e.g., the legal name of the user) and information to contact the user (e.g., mobile number or email address) in order to add them to the queue and contact the user once they are at the top of the queue. Moreover, in this example, the code may be configured automatically indicate to the enterprise computing system 102 the branch location 103*a-c* that the user wishes to visit thereby allowing the enterprise computing system 102 to automatically identify the relevant branch location without prompting the user via the graphical user interface. In the example of the first user input including the user selectively navigating to the graphical user interface via the client application 151, the enterprise computing system 102 may be able to automatically determine information regarding the identity of the user and contact information of the user via cross-referencing the account associated with the client application 151 within the client database 126. In this example, the second user input may include a selection of branch location 103*a-c* that the user wishes to be added to the queue for and a reason for their visit. In some embodiments, an agent or doorman at the branch location 103*a* may speak face-to-face with the user, obtain the contact and identify information of the user, and manually enter the user into the queue via a computing device at the branch location 103a.

At process 304, the mobile device 101 generates a request to enter the user into a queue based on the second input. For example, the user may provide information into each field of the welcome page and/or subsequent pages and select an icon that indicates the mobile device that the information has been entered. In response, the mobile device 101 may use the user information of the second user input in order to generate a request to the enterprise computing system. In some embodiments, the mobile device 101 may encrypt the request or otherwise obfuscate the data associated with the second input. In some embodiments, the mobile device 101 may package the request such that the request includes the client information, a location of the mobile device 101, an indication of the store which the client wishes to receive assistance at, or other relevant information. In some embodiments, the request includes geolocation data of the mobile device 101. In response to generating the request, the mobile device 101 may then transmit via a cellular network or a wireless interne connection, the request to the enterprise computing system at process 305.

At process 306, the mobile device 101 receives a confirmation from the enterprise computing system 102. The confirmation may be received by the mobile device 101 via the network 106. At process 307, the mobile device 101 displays a confirmation page in response to receiving the confirmation. In some embodiments, the confirmation may include instructions that automatically cause the mobile device 101 to navigate to the confirmation page displayed via a second graphical user interface on the display. In some embodiments, the confirmation may be in forms other than a page re-direct such as in the form of a text message, push notification. The confirmation may also include information regarding the success or failure of the client being added to a queue, an estimated wait-time, information regarding the queue, information regarding the status of the store, and/or information regarding alternative options that the client may take to resolve the reason for their visit without meeting face to face with an employee. In some embodiments, the mobile device 101 may send periodic updates including the geolocation data of the mobile device 101 to the enterprise computing system 102 in order to indicate a status (e.g., at the store location or has left the store location) of the mobile device 101 and thereby the user in the queue. Examples of confirmation pages are discussed further herein and particularly in reference to FIG. 6b below.

At process 308, the mobile device 101 receives a message to enter the store location from the enterprise computing system 102. The message may be received via the internet or a cellular network depending upon the form of the message. For example, the message may be sent in the form of a text message, email, phone call, or push notification. The message indicates to the mobile device 101 to generate a notification intended to grab the attention of the user and display contents of the message to the user. The contents of the message may include instructions to approach the building, particular instructions based on the context of the application, and/or instructions to respond. In some embodiments, the message may be generated by an agent at the branch location 103a via an agent input into a computing device connected to the enterprise computing system 102, for example, via an application programming interface (API) that displays the status of the queue and allows for the agent to manually manage the queue.

At process 309, the mobile device 101 receives the message and generates a notification. The notification is configured to notify a client that the message from the enterprise computing system 102 has been received. In one example, the mobile device 101 may automatically in response to receiving the message, sound an alarm, vibrate, make noise, or display the contents of the message. In some embodiments, the mobile device 101 may require a passcode or biometric identification before displaying the contents of the message to the user. In some embodiments, the mobile device 101 may receive a third user input and transmit the third user input to the enterprise computing system 102 that causes the enterprise computing system 102 to update the queue. For example, the third user input may be in the form of a text message back to the number that sent the message and indicate that the client is on their way in or that the client is no longer coming into the store. The mobile device 101 may then transmit the text message to the enterprise computing system 102.

Figure 4:
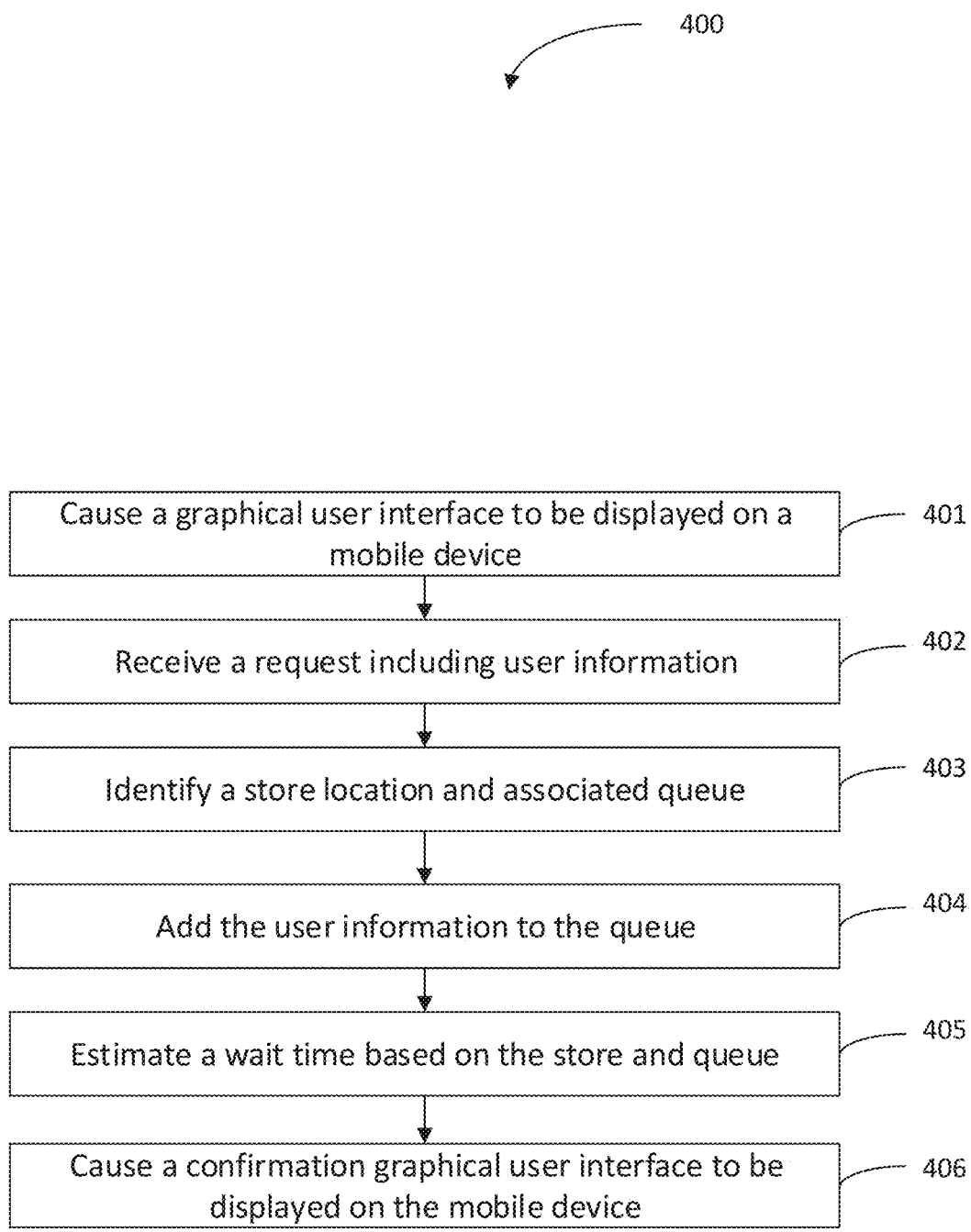
FIG. 4 is a flow diagram of a method of digitally adding a client to a queue using the system of FIG. 1, according to example embodiments.

Referring now to FIG. 4, a flow diagram of a method 400 of digitally adding a client to a queue is shown according to an example embodiment. In particular, the method 400 relates to a method of the enterprise computing system 102 managing one or more queues for a variety of branch/enterprise locations.

At process 401, the enterprise computing system 102 causes a graphical user interface to be displayed on a mobile device 101. The enterprise computing system may generate, access, or retrieve instructions (e.g., HTML instructions) and transmit the instructions to the mobile device in response to the mobile device accessing the enterprise computing system 102 via a browser, web application, or mobile application (e.g., client application 151). In particular and in one embodiment, the graphical user interface is provided by the enterprise client application 151 based on the user accessing and successfully authenticating into the application 151. The instructions are configured to cause a welcome page to be displayed on the mobile device 101. In some embodiments, the enterprise computing system 102 causes the graphical user interface to be displayed in response to the mobile device 101 navigating to a URL associated with the enterprise. For example, in some embodiments, the mobile device 101 may have scanned a code displayed outside of a branch location 103a-c that causes the mobile device 101 to automatically navigate to a URL associated with the code and the enterprise. In response, the graphical user interface may be provided via a web browser or client application 151 on the mobile device 101. In another example, the enterprise computing system 102 causes the graphical user interface to be displayed in response to the client application 151 on the mobile device 101 transmitting an indication that the user desires to be entered into a queue.

At process 402, the enterprise computing system 102 receives a request including user information. The request may be received by the enterprise computing system 102 via the network from the mobile device 101. The request may include information that corresponds to the fields of the graphical user interface (e.g., welcome page) generated by the enterprise computing device 102. For example, the request may indicate that a user associated with the mobile device wishes to be added to a queue in order to receive or access serves offered by the enterprise. The request may further include information regarding the identity of the user, needs of the user, preferred method of communication of the user, and/or other information of the client. For example, the request may include a preference to speak to an agent (e.g., retail supervisor, banker, teller, etc.) proficient in a particular language (e.g., Spanish, English, German, etc.). In some embodiments, the request (e.g., particular details from the request such as the preferred language) may be displayed to one or more agents at the branch location 103a on a computing device connected to the enterprise computing system 102, for example, via an API.

At process 403, the enterprise computing system 102 identifies a store location and a queue based on the user provided information The enterprise computing system 102 may identify the store location via an indication in the request. For example, an indication within the request may include a location of the mobile device 101 and the enterprise computing system 102 may identify a store location that is nearest in proximity to the location of the mobile device 101. In another example, the welcome page generated by the enterprise computing system 102 may have been determined to be at a particular store location based on the mobile device 101 capturing a code or other indicia captured by the mobile device 101 that may be linked or otherwise associated with the particular store location. Accordingly, in some examples, the enterprise computing system 102 may have already identified the store location in process 401 based on the unique code scanned. In another example, for example, where the user accesses the welcome page via the client application 151, the request may include a user input (e.g., into a respective field on the welcome page) that indicates the store location that the user wishes to access or enter. In another example, the enterprise computing system 102 may determine that a particular location does not have an agent available to assist a client in the particular language requested in the request. For example, a listing of the agents and their abilities (e.g., language proficiencies) may be stored within the enterprise computing system 102. The enterprise computing system 102 may cross-reference the available agents (e.g., agents that are currently or soon to be working based on a pre-determined schedule stored at the enterprise computing system) within the listing of agents to determine whether an agent having the requested language abilities is available or soon to be available. If the nearest branch location 103a does not have an agent that meets the needs of the client based on the request, the enterprise computing system 102 may determine the next nearest branch location 103b that does have an agent available that does meet the needs of the client (e.g., an agent that is proficient in the requested particular language). In some embodiments, the enterprise computing system 102 may notify the user that a particular location 103b will have an agent available to assist the user in the requested language at a later date determined based on a predefined schedule of the agents of the enterprise.

In some embodiments, the enterprise computing system 102 may periodically ping or request an update from the branch locations 103a-c to update information stored in local databases in order identify the appropriate particular queue based on the information received from the branch locations 103a-c. For example, the enterprise computing system 102 may receive from or ping the branch location 103a for information regarding the agents (e.g., personnel) working and/or the services that the respective agents are capable of assisting users with. Moreover, the enterprise computing system 102 may receive an indication from the branch location 103a of when a user within the queue enters the building, is being assisted, or has left the building. In some embodiments, the indications are sent in response to an agent at the branch location 103a manually entering agent inputs into a branch location device. In some embodiments, the enterprise computing system 102 may store the information regarding when the user has entered the building and when the user has left the building in order to build a statistical database of how long a visit from a user usually takes. The statistical database may be used to more accurately calculate the estimated wait-times as described herein.

The enterprise computing system 102 may identify a queue for the client by determining the reason for the client visit (e.g., which may be indicated in the request), determining the type of services that the client needs based on the reason, and in turn identifying a queue that corresponds to the type of service based on staffing on building constraints. For example, the enterprise computing system 102 may determine that the client is requesting to visit so that the client can re-finance a loan, the enterprise computing system 102 may further determine that the client needs to speak or work with a banker (e.g., as opposed to a teller) in order to accomplish the client's needs, and the enterprise computer system 102 may identify a queue that corresponds to the bankers (e.g., a banker queue) as the queue that the client should be placed in. In some embodiments, the enterprise computing system 102 may have a look-up table or other referential database that corresponds reasons for client's visits to particular queues. The types of queues available may be dependent on the branch location, employee availability, or application in which the digital check-in system is deployed in. In another example, the request may include a user input that indicates the queue in which the client wishes to be entered into.

At process 404, the enterprise computer system 102 adds the client to the queue identified in process 403. The enterprise computer system 102 may add the client information received in the request to the queue. In some embodiments, the enterprise computer system 102 may add the user to the queue based on particular rules. For example, the client information may be added to the queue on a first come first served basis such that each client is added to the end of the queue. In another example, the client may be added to queue in front of other clients when there are special considerations such as the urgency of the reason for the client visit, the at-risk health effects of particular clients (e.g., indicated in the client information), or other disability concerns (e.g., indicated via the client information). In some embodiments, an agent at the branch location 103a associated with the queue may be able to manually move the position of the user within the queue via an agent input into a computing device at the branch location 103a displaying the queue and/or status of the queue.

At process 405, the enterprise computer system 102 estimates, calculates, or otherwise determines a wait-time based on the store and the queue. For example, the enterprise computer system 102 may determine the amount of clients in front of the client on the queue, determine an amount of time that an average client takes within the store, determine the amount of staff working and anticipated to be working in future times (e.g., received via either an employee schedule stored in memory and/or an indication received from an enterprise device at the store), and calculate an estimated wait-time based thereon. For example, the average visitor time for visitors having a reason of opening a checking account (OCA) may be calculated via equation (1):

$$\text{Avg Time}(OCA) = \frac{\sum_{1}^{N} \text{Visit times of all visitors for } OCA}{N} \quad (1)$$

In this example, determining the average visitor time for a particular service (e.g., OCA) at a particular location (or for a particular agent) may include accessing from the statistical database having information regarding the amount of time each client spent at the branch for a particular reason and averaging them. In some embodiments, outliers (e.g., above 1, 1.5, or 2 standard deviations) of the statistical data may be excluded from the determined average amount of time for each service. Moreover, the enterprise computing system 102 may estimate a wait-time via determining the number of clients in the queue before the user, determining the particular service for each of the clients, determine the average visitor time for the services associated with each of the clients, and summing the average visitor time for each client together. In some embodiments, the total number of available agents for the queue may also be accounted for. For example, an estimated wait-time (WT) may be calculated via equation (2):

$$\text{Estimated } WT = \frac{\sum (\text{Each visitor in queue} * \text{Avg Time (respective reason)})}{\text{Total Number of Available Agents}} \quad (2)$$

In some embodiments, the average visitor time may be based on the reason for the visit, the particular branch location 103a-c, the particular users/clients, and/or a combination thereof. In some embodiments, the enterprise computer system 102 may use a global average that indicates how long any client takes to get through the queue regardless of the reason for their visit. In such an example, the enterprise computer system 102 may estimate the wait-time by multiplying the number of clients in front of the client by the global average.

At process 406, the enterprise computer system 102 causes a confirmation page to be displayed on a graphical user interface of the mobile device 101. For example, the enterprise computer system 102 may send a re-direct instruction to the mobile device 101 that causes the mobile device 101 to navigate to and display a confirmation page. The confirmation page may include an indication of the status of the client in the queue, the estimated wait-time, a selectable icon configured to instruct the enterprise computer system to remove the client from the queue if the client selects the icon, special instruction regarding the store (e.g., either stored in the enterprise computing device for each store or manually communicated to the enterprise computing device from the enterprise device within the store), and/or alternative options for the user to potentially remedy the reason for the client visit without needing to enter the store. In one example, alternative options may include a hyperlink to a webpage including instructions targeted to the client based on the reason for the reason for the clients visit. The hyperlink and/or instructions may be determined or generated by the enterprise computing system 102 via identifying the reason for the client visit and cross-referencing alternative options for the reason within a referential database. In other embodiments, the hyperlink and/or instructions may be determined or generated by the enterprise computing system 102 via the use of a virtual assistant or artificial intelligence that may identify alternative options based on the reason for the client visit. In some embodiments, the enterprise computing system 102 may provide a virtual assistant to the client via the mobile device in order to assist the user in accomplishing the goals of the client visit. For example, the virtual assistant may include an artificial intelligent bot associated with the enterprise that is configured to interact and assist the user. The virtual assistant or artificial intelligence could, for example, cross-reference or learn from prior users and their interactions with the enterprise to suggest an intuitive alternative method to resolve the reason for the clients visit without needing to visit a building. For example, the virtual assistant may, from utilizing artificial intelligence, learn the frictional points that prevent users from utilizing digital solutions to resolve their reasons for visiting a branch by analyzing where online users stop trying to solve tasks such as opening a checking account. In such an example, the virtual assistance may learn that users have difficulty navigating to the page associated with opening a checking account and provide intuitive hyperlinks to the user to assist them and the mobile device in navigating to the web page. Moreover, the virtual assistant may walk the user, step by step, through the process of opening the account, to ensure that the user accomplishes the goal of opening the account (e.g., the goal indicated as the reason for their visit to the store).

Figure 5:
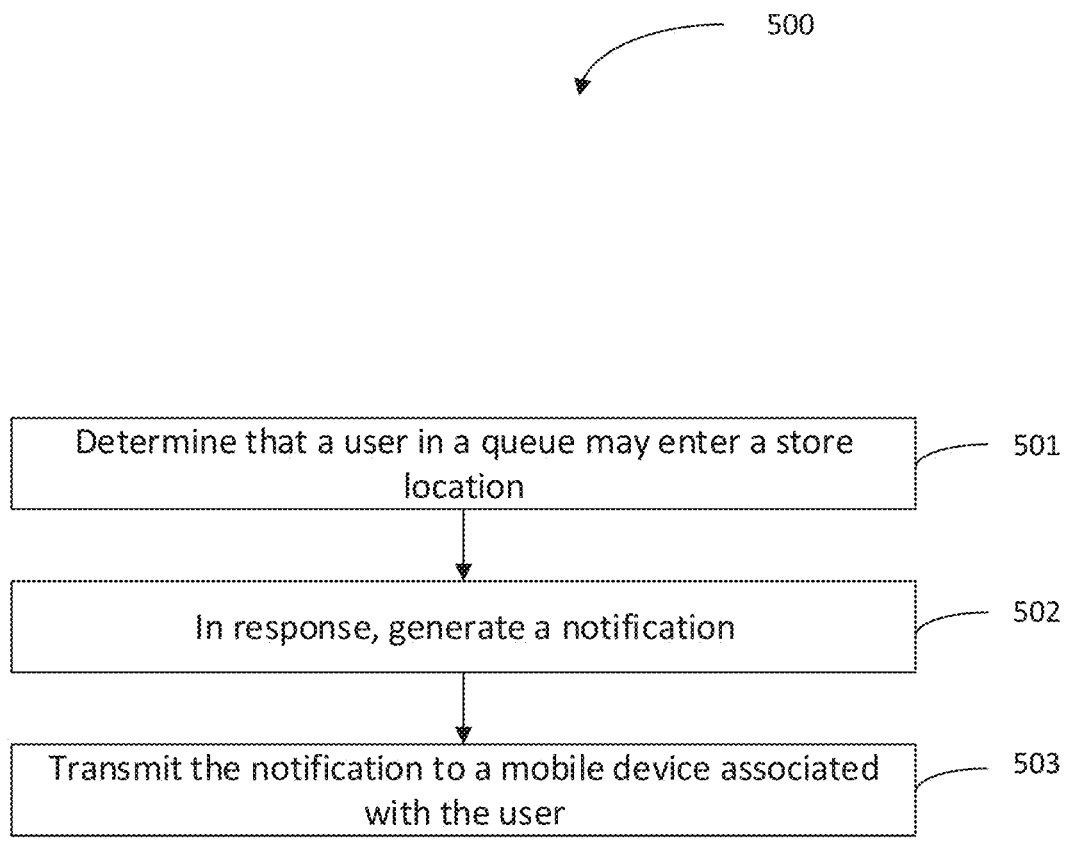
FIG. 5 is a flow diagram of a method of notifying a user that the user may enter a branch or location using the system of FIG. 1, according to an example embodiment.

Referring now to FIG. 5, a flow diagram of a method 500 of notifying a user that they may enter a branch or location is shown according to an example embodiment. In particular, the method 500 relates to a method of an enterprise computing system 102 managing one or more queues.

At process 501, the enterprise computing system 102 determines that a user in a queue may enter the store location. In particular, the enterprise computer system 102 may receive indications from employees within the store location regarding when a user enters and exits. Accordingly, the enterprise computer system 102 may eliminate the users from the queue upon the users exit from the store based on the input from the employees into an enterprise device (e.g., tablet, personal computer, or mobile device) located at the store. The enterprise computer system 102 may, with the elimination of the client that exited, determine that user is at the top of the queue may enter the store location. In some embodiments, for example where additional employees arrive for work at a particular store (e.g., indicated the enterprise computing device via an employee input at a store location, camera data, or employee scheduling data stored within the enterprise computing system), the enterprise computing system 102 may determine that additional users may enter. In some embodiments, the enterprise computing system 102 may determine that the user may enter the store location in response to receiving an agent input via a computing device at the branch location 103a associated with the queue. For example, an agent may indicate to the enterprise computing system 102 via the computing device that another user from the store may enter the store. Further, the agent may indicate to the enterprise computing system via the computing device that a particular user in the queue should be prompted to enter the building.

At process 502, in response to determining that the user in the queue may enter the store, the enterprise computing system 102 generates a notification or message that is configured to cause a mobile device to react (e.g., via sound, vibration, or lighting up) in attempt to alert or notify the user that they may approach the store. The notification or message may have content that includes particular instructions (e.g., "please wear a mask," "please first see the employee at the door for a temperature check," etc.) based on the application in which the system is being deployed. The notification may also provide instructions for the user to enter at particular times, through particular doors, or to stand in a particular area depending upon the particular store, management rules, or state or local regulations. The enterprise computing system 102 may have the instructions stored within a memory such that the enterprise computing system 102 may access the instructions and generate the notification based on the identified store location.

At process 503, the enterprise computing system 102 transmits the notification to the mobile device 101 associated with the client information. For example, the enterprise computing system 102 may transmit a text message, a push notification, or other notification type to the mobile device identified in the client information. The type of notification may be based on a preference of the client that was received by the enterprise computer system 102 with a request to check into the queue. In this way, a client may reliably and conveniently check-in to a store and be notified when an employee is available to assist them.

Figure 6A:
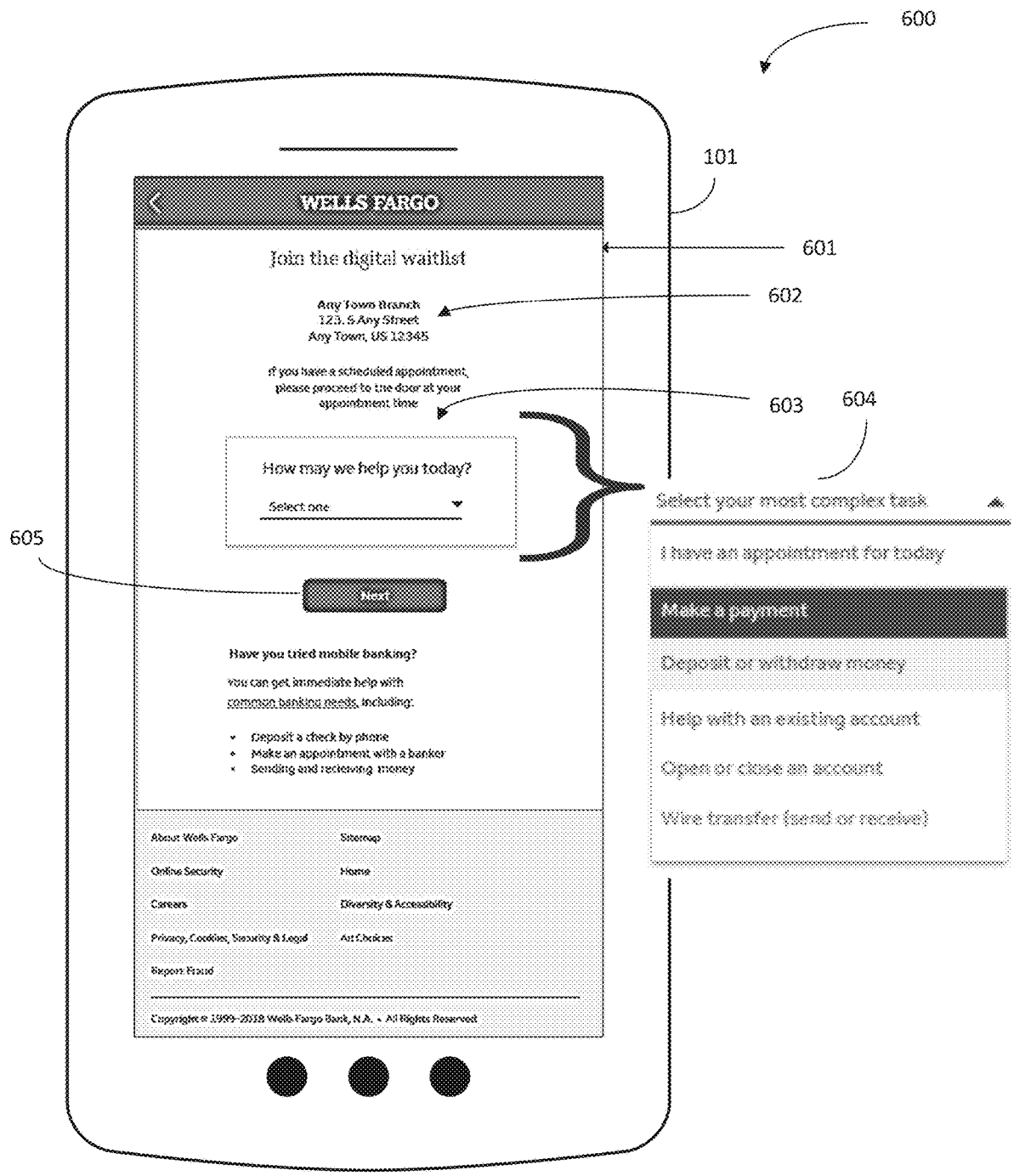
FIG. 6a depicts the mobile device of FIG. 1 displaying a welcome page via a graphical user interface, according to an example embodiment.

Referring now to FIG. 6a, a mobile device 101 displaying a welcome page via a graphical user interface 600 is shown according to an example embodiment. The graphical user interface 600 is presented on a display of the mobile device 101 and includes a welcome page 601. The welcome page includes a first area 602 indicating the store location. In this example, the client has scanned a code with the mobile device 101 such that the enterprise computing device provided instructions to the mobile device 101 to display a welcome page specific to the store location associated with the code. However, in alternative examples, the first area 602 may include a field in which a client may enter in a preference of which store that the client wishes to visit.

The welcome page 601 also includes a second area 603 that includes a field that allows for a client to select or enter a reason for the client visit. In this example, the second area 603 includes a selectable drop down menu 604 that provides the client with a list of common tasks that clients usually wish to accomplish on their visit. The second area 603 also includes a prompt to the client to select the most complex task. Moreover, the welcome page 601 also includes a selectable icon 605 that is configured to cause the mobile device, when selected, to display a different screen. The different screen may include another welcome page (e.g., a check-in page). In other examples, the check-in page and the welcome page may be presented on the same graphical user interface.

Figure 6B:
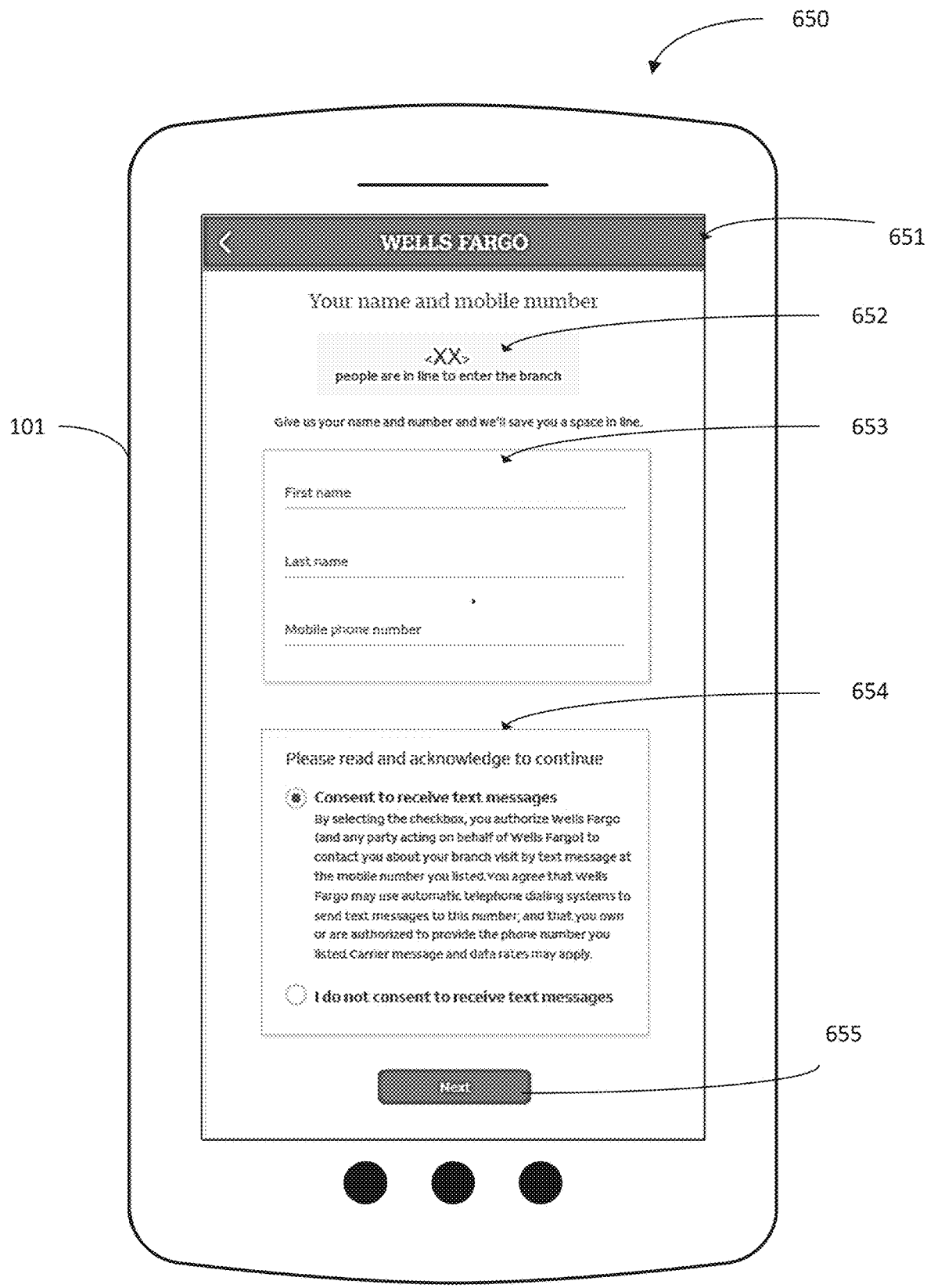
FIG. 6b depicts the mobile device of FIG. 1 displaying a check-in page via a graphical user interface, according to an example embodiment.

Referring now to FIG. 6b, a mobile device displaying a check-in page via a graphical user interface 650 is shown according to an example embodiment. The graphical user interface 650 is presented on a display of the mobile device 101 and includes a check-in page 651. The check-in page 651 allows for a client to enter additional client information. For example, the check-in page 651 includes a first area 653 that includes a first field for the client to enter in a first name, a second field for the client to enter in a last name, and a third field for the client to enter in the mobile phone number that the client wishes to be notified at when the client is out of the queue. In other examples, the welcome page and the check-in page may be displayed on the same graphical user interface. In another example, the check-in page 651 may include additional or fewer fields that allow a user to enter in additional client information or preferences such as a preferred method of communication.

The check-in 651 page also includes a second area 652 that is configured to display dynamic information regarding the amount of clients currently in queue/an estimated wait-time. The dynamic information in the second area 652 is configured to dynamically and automatically provide information to the client to inform the client of the status of the store and queue such that the client may make a decision as to whether he/she wants or needs to have a client visit at this time. Accordingly, the second area 652 provides for an improved ability for the digital check-in system 100 to interact with a client.

Figure 6C:
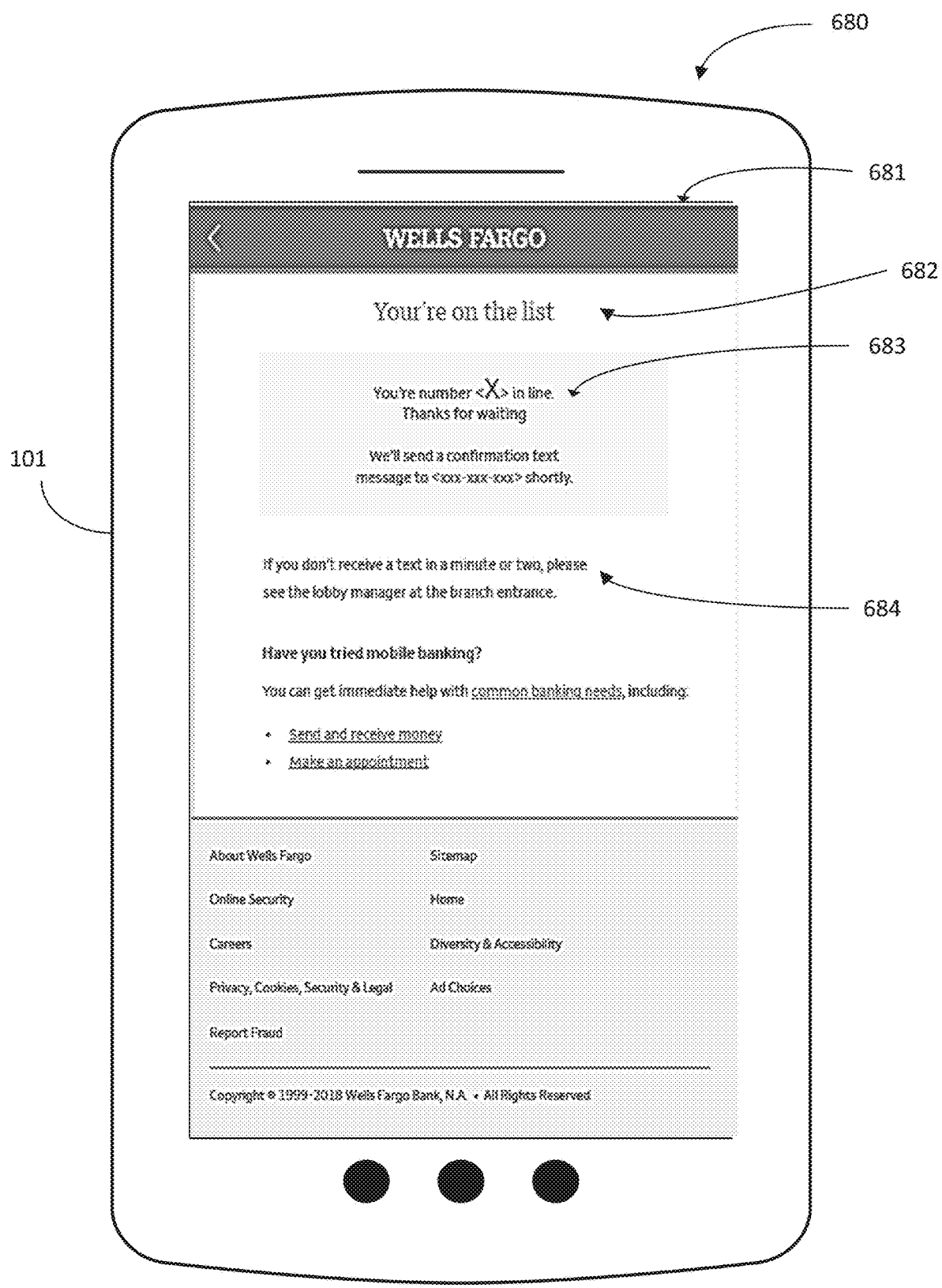
FIG. 6c depicts the mobile device of FIG. 1 displaying a confirmation page via a graphical user interface, according to an example embodiment.

Referring now to FIG. 6c, a mobile device 101 displaying a confirmation page via a graphical user interface 680 is shown according to an example embodiment. The graphical user interface 650 is presented on a display of the mobile device 101 and includes a confirmation page 681. The confirmation page 681 includes a first area 682 indicating that the client was successfully added to the queue, a second area 683 indicating the status of queue (e.g., an estimated wait-time or number of clients before the client in the queue), and a third area 684 that provides the client with additional instructions. It is to be appreciated that the confirmation page 681 is intended to be illustrative of only one example of a confirmation page 681 and in other examples the confirmation page 681 may include additional or fewer areas as well as be configured to present other forms of information discussed herein both dynamically and statically.

Figure 7:
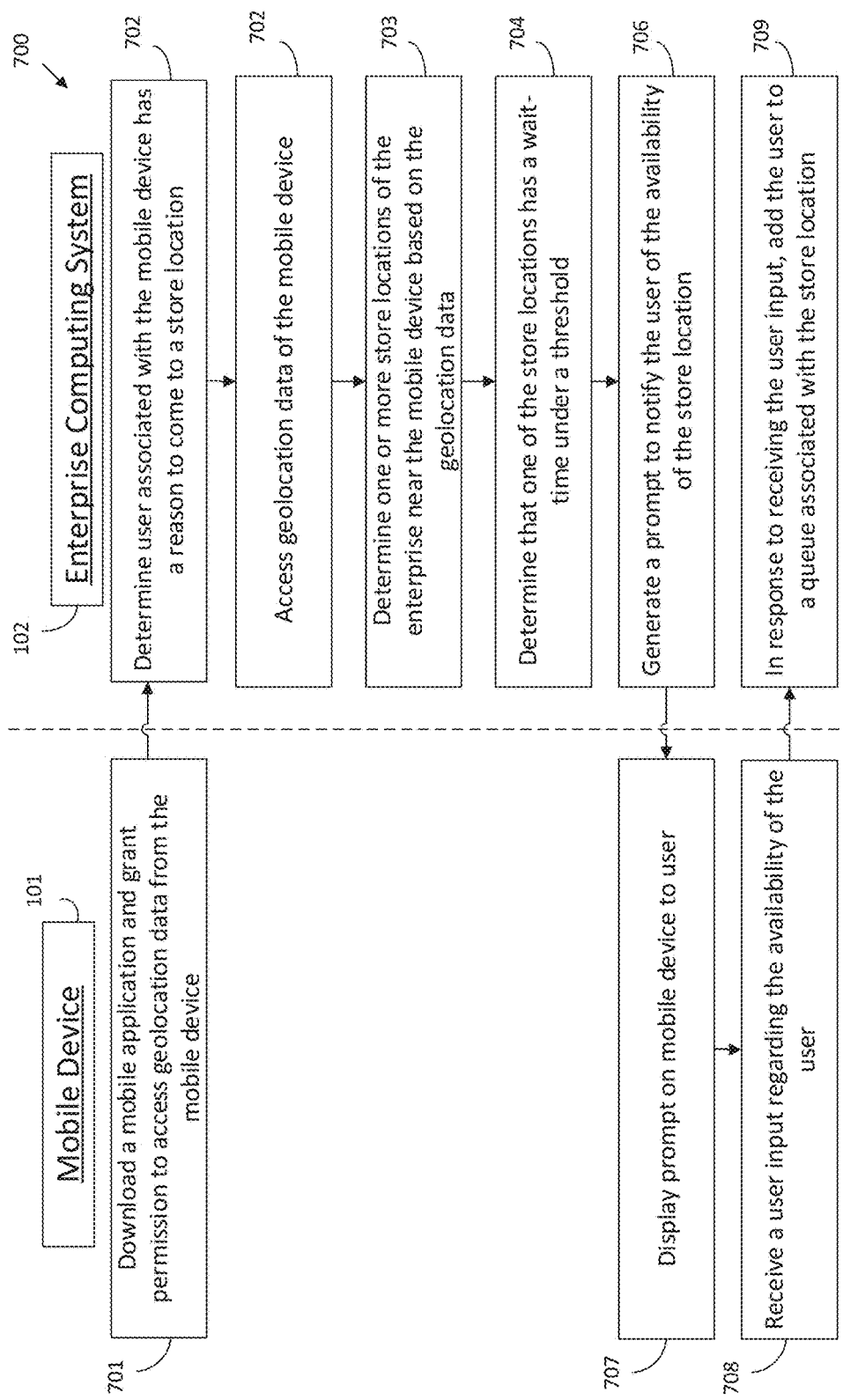
FIG. 7 depicts a flow diagram of a method of digitally checking into a queue via geolocation data of the mobile device of FIG. 1 is shown according to an example embodiment

Referring now to FIG. 7, a flow diagram of a method 700 of digitally checking into a queue via a mobile device 101 is shown according to an example embodiment. For example, the method 700 includes prompting the user via the mobile device based on a determination that the mobile device is near a location of a store of the enterprise and a determination that the user associated with the mobile device has a reason to come to the store. In some embodiments, the reason for the user to come to the store may include to a need to wet sign documents, pick up a physical transaction card (e.g., a debit or credit card), pick up other items (e.g., merchandise), or drop off/present items (e.g., a social security card, birth certificate, driver license, etc.).

At process 701, a user grants the enterprise computing system 102 permission to access or receive geolocation data from a mobile device 101 associated with the user. For example, the user may, via various user inputs, select an option to download and install a mobile application associated with the enterprise onto the mobile device 101. The user may then, via various user inputs, enter in login credentials or other identifying information into the mobile application that can be used to authenticate and verify the identity of the user as a user associated with an account or action at the enterprise. The mobile application or webpage may prompt the user to grant permission for the mobile device 101 to share geolocation data with the enterprise computing system 102. In some embodiments, the permissions may include various settings such as permissions for the enterprise computing system 102 to access the geolocation of the mobile device at any time, access the geolocation of the mobile device at particular times (e.g., between particular hours defined by the user via a user input, or only when the mobile device has the mobile application open, etc.), or access the geolocation only after prompting the user. The permissions may be set within the mobile device 101, within the enterprise computing system 102, or both.

At process 702, the enterprise computing system 102 determines that the user associated with the mobile device 101 has a reason to come to a store location 103a-c. For example, the enterprise computing system 102 may determine an account or action associated with the user based on the login credentials or other identifying information received from the mobile device. The enterprise computing system 102 may link information regarding the mobile device (e.g., MSIN, or IP address) to the account or action of the user at the enterprise. The enterprise computing system 102 may determine that based on the accessed account of the user, that the user has a reason or need to stop into a branch location of the enterprise in order to finish an action or to perform an action. For example, the user may have recently established an account with the enterprise and may need to stop into a location to sign paperwork, pick up a card (e.g., a transaction card) for the enterprise, or may need to pick up merchandise (e.g., a gift, or item purchased). Accordingly, if the user has an outstanding action that is flagged within the enterprise computing system 102, the enterprise computing system 102 will determine that there is a reason for the user to come into a physical branch location 103*a-c*. In some embodiments, the outstanding action may remain flagged in the account or action associated with the user until it is fulfilled or completed. In some embodiments, an agent at a branch location 103*a* may manually enter that the user should be notified to come to a branch location. For example, the agent may enter into a computing device at a branch location 103*a* that the user is needed for a wet signature after the agent has prepared a particular document. The enterprise computing system 102 may then, in response to the agent input, flag user as a person that has a reason to come to a store location.

At process 703, the enterprise computing system 102 accesses and/or monitors the geolocation data of the mobile device 101. For example, based on the permissions granted at process 701, the enterprise computing system 102 may periodically ping or request geolocation data from the mobile device 101. The enterprise computing system 102 may ping or request the geolocation every hour, every few hours, or continuously based on the permissions. In another example, the enterprise computing system 102 may not ping or request the geolocation data, rather the mobile device 101 may transmit the geolocation data in response to the user launching the mobile application 151 on the mobile device 101, entering a user input to send the geolocation data, or navigating the a particular URL of the enterprise that causes the mobile device 101 to transmit the geolocation data.

At process 704, the enterprise computing system 102 determines one or more store locations of the enterprise near the mobile device based on the geolocation data. For example, the enterprise computing system 102 may have the location data (e.g., address information) of multiple store locations stored within a database. The enterprise computing system 102 may determine that one or more of the store locations are within a pre-defined distance from the mobile device based on the geolocation data of the mobile device 101. As an example, the enterprise computing system 102 may determine the geolocation of the mobile device based on the received geolocation data and further determine all of the stores around the geolocation of the mobile device 101 that the user may be interested in stopping at (e.g., all of the stores within a pre-defined radius, driving distance, or along the route that the user is likely traveling). In one example embodiment, the enterprise computing system 102 may determine based on monitored or historical geolocations of the mobile device 101 that the user is likely heading to work, home, or to a weekend home at particular times during the week. The enterprise computing system 102 may receive geolocation data from the mobile device 101 at a particular time that is indicative that the user is heading to work, home, or the weekend home (e.g., indicative because the user is on a road associated with the direction of the likely destination) and determine one or more store locations that are conveniently located along the route that the user is likely traveling. As an example, store locations that are conveniently located along the route are store locations determined have a detour time less than a predetermined threshold (e.g., 5 minutes, 10 minutes, or 15 minutes) from the route. It is to be appreciated that these example are meant to be non-limiting and that in other examples or embodiments various algorithms (e.g., predictive algorithms) may be implemented to determine one or more store locations that the user may be interested in stopping at based on the geolocation data. Moreover, the enterprise computing system 102 may only determine one or more store locations that are capable of assisting the user with the reason for the visit. For example, the enterprise computing system 102 may only select branch locations that have the personnel and/or equipment needed to assist the user. As an example, if the reason for the visit includes picking up a new debit card, only store locations capable of (e.g., having the equipment to print the card) printing a debit card may be selected by the enterprise computing system 102. As explained above, the personnel, the capabilities of the personnel, and/or the capabilities of each branch location 103*a-c* may be stored in a database within the memory and referenced to determine whether a particular store is capable of assisting a client with a particular selected need or reason for visiting. In some embodiments, the preferred store locations of a particular user are stored within an associated account within the client database 125 and only those stores are used.

At process 705, the enterprise computing system 102 determines that one of the store locations has a wait-time under a threshold. For example, the enterprise computing system 102 determines, from the one or more store locations, at least one store that has a wait-time sufficiently low (e.g., under a pre-defined threshold) such that the user may stop by the store location in order to complete the reason that the user needs to stop into a location associated with the enterprise. In an embodiment, the enterprise computing system 102 may also determine that the at least one store has the particular capabilities for the reason that the user needs to visit. For example, the enterprise computing system 102 may have stored in a database the limits and abilities of each store location and agents for each store location. The enterprise computing system 102 may access that database and cross-reference the reason that the user needs to stop into a location in order to determine that the at least one store has the capability to assist the user. In some embodiments, the threshold may be pre-defined by the user via various user inputs into the mobile application on the mobile device 101. In some embodiments, the threshold may be pre-defined based on a geographical area of the user. In some embodiments, the threshold may be pre-defined with a default value (e.g., 5 minutes) by the enterprise computing system 102.

The enterprise computing system 102 may determine the at least one store that has the wait-time below the threshold by accessing the queues of each of the store locations in the one more stores. For example, similar to as described above, each of the store locations may have one or more queues with a list of clients and associated reasons for the client visits. In some embodiments, the one or more queues may have a wait-time associated with them. In some embodiments, the enterprise computing system 102 calculates the wait-time for each queue based on the number of clients and the respective reasons for their visit.

At process 706, the enterprise computing system 102 generates a prompt to notify the user of the availability of the store location. For example, in response to determining the at least one store, the enterprise computing system 102 may generate prompt and transmit the prompt to the user. The prompt may be in the form of a SMS message, a push notification, a graphical user interface, or a combination thereof. The prompt is configured to be sent to the mobile device 101 and notify the user of the available store location. For example, the prompt may indicate that there is a store at a particular distance away (e.g., miles, or time) that has a particular wait-time (e.g., no wait-time, 2 minutes, etc.) that the user can stop into to conveniently complete any actions that the user needs to be in a store location to complete. In another example, the reason may be indicated by the user at process 702 and the enterprise computing system 102 may generate the prompt to notify the user of the availability of local store locations at various times in order to allow the user to go to a store location only when there is little to no wait-time. The prompt may include a selectable icon (e.g., if the prompt is in the form of a graphical user interface) or instructions the user to respond to the prompt (e.g., if the prompt is in the form of a SMS message) to indicate whether the user would like to be added to a queue of the store location. The prompt may also include a selectable icon or instructions to the user to respond that the user will not be able to stop by the store location, in which case the enterprise computing system 102 would not add the user to the queue associated with the store.

At process 707, the mobile device 101 displays the prompt. The mobile device 101 may display the prompt based on the form factor of the prompt. For example, the mobile device 101 may display a push notification and when the user selects the push notification, the mobile device may display a graphical user interface within the mobile application that includes information regarding the prompt and various selectable icons. For example, a selectable icon may include an option to not receive any additional updates or prompts, which may be configured to indicate to the enterprise computing system 102 that the user is not interested receiving additional suggested locations. In another example, the mobile device 101 may display the prompt within a messaging application such that the user can communicate with the enterprise computing system 102 via the messaging application on the mobile device 101. In such an example, the messaging application may display a message generated by the enterprise computing system 102 that includes text or one or more graphical icons indicating to the customer the location of the at least one store, the wait-time, and detour time. In some embodiments, the location of the at least one store may include a hyperlink that, when selected, causes the mobile device 101 to navigate to a map application and automatically route a trip to the location of the store from the location of the mobile device 101. In an embodiment, a selection of the hyperlink may also automatically cause the user to be added to a queue associated with the store.

At process 708, the mobile device 101 receives a user input regarding the availability of the user. In an example, the user input may include a selection of a selectable icon displayed on the graphical user interface. The selectable icons displayed on the graphical user interface may include an option to be added to the queue associated with the store, an option to decline the suggestion to visit the store, an option configured to cause the mobile device to provide a map directions or navigation to the store, or an option to discontinue receiving prompts from the enterprise computing system 102. In another example, the user input may be a response in a messaging application to the prompt received as a message of "yes" if the user wishes to be added to the queue associated with the store or "no" if the user does not want to be added to the queue associated with the store. In another example embodiment, the prompt may include an option for the user to schedule an appointment for a later date. If the option to schedule an appointment is selected, the user may be called by an agent to schedule the appointment or automatically navigated to a user interface associated with scheduling appointments at the enterprise.

At process 709, the enterprise computing system 102, in response to receiving the user input, adds the user to a queue associated with the store location. In some embodiments, the user may be added to the queue based on the processes described above. In some embodiments, the user is added to the queue and a confirmation page, similar to as described above, is displayed to the user to inform them that they have been successfully added to the queue. In some embodiments, the enterprise computing system 102 is further configured to provide a notification to the user via the mobile device 101 when the user is at the top of the queue. In an example embodiment, the enterprise computing system 102 may continue to monitor the location of the mobile device 101 after the user has been added to the queue and either move the user up or down the queue based on an estimated time that it will take the user to arrive at the store location. In some embodiments, the enterprise computing system 102 will not notify the user that the user may enter the store location until the enterprise computing system 102 determines that the geolocation of the mobile device 101 is within a pre-defined geographic area (e.g., within a geo fence) of the store (e.g., that the mobile device is in the parking lot of the store). Moreover, once the location of the mobile device 101 is determined to be within the geo-fence, the enterprise computing system 102 may provide a notification to personnel in the store, for example, by updating a display at the store with an indication that the user (e.g., that has already been added to the queue) has arrived. In this way, the enterprise computing system 102 can efficiently and effectively improve the ability of the enterprise to handle customer flows and experiences in accordance with regulations and guidelines.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" or "computing system" may include hardware structured to execute the associated functions described herein. In some embodiments, each respective "circuit" or "computing system" may include machine-readable media for configuring the hardware to execute the associated functions described herein. The "circuit" or "computing system" may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" or "computing system" may include any type of component for accomplishing or facilitating achievement of the associated operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" or "computing system" may also include one or more processors communicatively coupled to one or more memory or memory devices. In this regard, the one or more processors may execute instructions stored in the memory or may execute instructions otherwise accessible to the one or more processors. The one or more processors may be constructed in a manner sufficient to perform at least the associated operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" or "computing system" as described herein may include components that are distributed across one or more locations.

An exemplary system for implementing the overall system or portions of the embodiments might include a computer(s), including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of managing a digital queue for a branch location, the method comprising:
  receiving, by an enterprise computing system associated with the branch location, a request from a mobile device based on the mobile device navigating to a uniform resource locator (URL) from scanning a code associated with the branch location;
  in response to the request, causing, by the enterprise computing system, a graphical user interface (GUI) to display on the mobile device that prompts a user for additional information via one or more selectable fields regarding the request, wherein the one or more selectable fields are based on the branch location, and wherein at least one of the one or more selectable fields is prepopulated;
  receiving, by the enterprise computing system from the mobile device and via the one or more selectable fields of the GUI, the additional information including identity information regarding the user and a reason for the request;
  automatically identifying, by the enterprise computing system, a queue specific to the branch location based on the request and the additional information;
  estimating, by the enterprise computing system, a wait-time for the user based on the identified queue and the request, wherein estimating the wait-time comprises determining a number of clients in the queue before the user, determining a reason for visiting for each of the number of clients, determining an average time for each reason for visiting, and determining an estimated wait-time based thereon;

adding, by the enterprise computing system, the user to the queue;

updating, by the enterprise computing system, the GUI displayed on the mobile device to depict a confirmation page presenting a confirmation notification based on a page re-direct instruction, wherein the confirmation notification indicates that the user has been added to the queue, and wherein the confirmation page comprises a dynamic area configured to update automatically based on a real-time status of the queue; and in response to determining the mobile device is within a geolocation area, updating, by the enterprise computing system, a GUI of a computer at the branch location indicating the user of the queue has arrived.

2. The method of claim 1, wherein the confirmation notification includes the estimated wait-time.

3. The method of claim 1, wherein identifying the queue comprises pinging the branch location to determine a status of one or more queues at the branch location, and determining the queue from the one or more queues based on the reason for the request and the status of the one or more queues.

4. The method of claim 1, wherein the reason for the request includes one of multiple pre-determined options displayed on the GUI of the mobile device.

5. The method of claim 1, further comprising, authenticating, by the enterprise computing system, the user based on geolocation data received from the mobile device being within the geolocation area.

6. The method of claim 1, further comprising monitoring, by the enterprise computing system, a geolocation of the mobile device, and removing, by the enterprise computing system, the user from the identified queue based on a determination that the geolocation of the mobile device is outside of the geolocation area for more than a predefined amount of time.

7. The method of claim 1, further comprising transmitting, by the enterprise computing system to the mobile device, a notification that the user may enter the branch location based on a determination that the user is next in the identified queue and geolocation data of the mobile device indicating that the mobile device is within the geolocation area.

8. The method of claim 7, wherein the identity information includes a legal name of the user and a phone number of the user, and wherein the notification is sent, by the enterprise computing system, via a text message to the phone number.

9. The method of claim 8, wherein the confirmation notification is generated in a hypertext markup language (HTML) format and configured to be displayed within a web browser or mobile application associated with the enterprise on the mobile device.

10. A method of managing digital queues for a store location, the method comprising:

receiving, by an enterprise computing system associated with the store location, a request from a mobile device based on the mobile device navigating to a uniform resource locator (URL) from scanning a code associated with the store location;

causing, by the enterprise computing system, a graphical user interface (GUI) to display on the mobile device, the GUI prompting a user for additional information via one or more selectable fields regarding the request, wherein the one or more selectable fields are based on the store location, and wherein at least one of the one or more selectable fields is prepopulated;

receiving, by the enterprise computing system from the mobile device and via the one or more selectable fields of the GUI, the additional information, the additional information including identity information regarding the user and a reason for the request;

automatically identifying, by the enterprise computing system, the store location and a queue based on the request and the additional information;

estimating, by the enterprise computing system, a wait-time based on the identified queue and the store location, wherein estimating the wait-time includes determining, by the enterprise computing system, a number of clients in the identified queue before the user, a reason for visiting for each of the number of clients, and an average time for each reason for visiting;

adding, by the enterprise computing system, the user to the queue that is specific to the store location;

updating, by the enterprise computing system, the GUI displayed on the mobile device to depict a confirmation page presenting a confirmation notification based on a page re-direct instruction, wherein the confirmation notification indicates that the user has been added to the queue and indicating information regarding an estimated wait-time, and wherein the confirmation page comprises a dynamic area configured to update automatically based on a real-time status of the queue; and in response to determining the mobile device is within a geolocation area, updating a GUI of a computer at the store indicating the user of the queue has arrived.

11. The method of claim 10, wherein identifying the queue includes determining the queue from multiple queues associated with the store location based on the reason for the request.

12. The method of claim 10, further comprising transmitting, by the enterprise computing system to the mobile device, a notification to enter the store location based on determining that the user is next in the queue.

13. A system comprising:

a processor; and a memory storing instructions that, when executed by the processor, cause operations including:

receive a request from a mobile device based on the mobile device navigating to a uniform resource locator (URL) from scanning a code associated with a store location of the store;

cause a graphical user interface (GUI) to display on the mobile device that prompts the user for additional information via one or more selectable fields regarding the request, wherein the one or more selectable fields are based on the store, and wherein at least one of the one or more selectable fields is prepopulated;

receive, from the mobile device and via the one or more selectable fields of the GUI, the additional information including identity information regarding the user and a reason for the request;

automatically identify a queue specific to the store location based on the request and the additional information;

estimate a wait-time for the user based on the identified queue and the request, wherein estimating the wait-time comprises determining a number of clients in the queue before the user, determining a reason for visiting for each of the number of clients, determining an average time for each reason for visiting, and determining an estimated wait-time based thereon;

add the user to the queue;

update the GUI displayed on the mobile device to depict a confirmation page presenting a confirmation notification based on a page re-direct instruction, wherein the confirmation notification indicates that the user has been added to the queue, and wherein the confirmation page comprises a dynamic area configured to update automatically based on a real-time status of the queue; and in response to determining the mobile device is within a geolocation area, update a GUI of a computer at the store location indicating the user of the queue has arrived.

14. The system of claim 13, further comprising instructions that, when executed by the processor, cause operations including provide a confirmation notification to the user indicating that the user has been added to the queue and indicating information regarding the estimated wait-time.

15. The system of claim 13, further comprising instructions that, when executed by the processor, cause operations including, transmit a notification to the mobile device to enter the store based on a determination that the user is next in the queue and geolocation data of the mobile device being within the geolocation area.

16. The system of claim 15, wherein the notification is transmitted via a text message to the mobile device.

* * * * *